United States Patent
Shiota et al.

(10) Patent No.: US 11,281,066 B2
(45) Date of Patent: Mar. 22, 2022

(54) LIGHT DISTRIBUTION CONTROL DEVICE AND ELECTRONIC DEVICE

(71) Applicant: TIANMA JAPAN, LTD., Kanagawa (JP)

(72) Inventors: Kunihiro Shiota, Kanagawa (JP); Ken Sumiyoshi, Kanagawa (JP); Masanori Shirokawa, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 343 days.

(21) Appl. No.: 16/660,901

(22) Filed: Oct. 23, 2019

(65) Prior Publication Data
US 2020/0124936 A1    Apr. 23, 2020

(30) Foreign Application Priority Data

Oct. 23, 2018 (JP) ............................. JP2018-199435
Jun. 14, 2019 (JP) ............................. JP2019-110965

(51) Int. Cl.
*G02F 1/1676* (2019.01)
*G02F 1/167* (2019.01)
(Continued)

(52) U.S. Cl.
CPC ............ *G02F 1/1676* (2019.01); *G02F 1/167* (2013.01); *G02F 1/1685* (2019.01); *G02F 1/16756* (2019.01); *G02F 2201/124* (2013.01)

(58) Field of Classification Search
CPC ............ G02F 1/136286; G02F 1/1368; G02F 1/136213; G02F 1/13624; G02F 2201/121; G02F 2201/123; G02F 1/134345; G02F 1/133621; G02F 2202/10; G02F 1/134354; G02F 1/167; G02F 1/136227; G02F 1/136295; G02F 1/16762; G02F 1/16766; G02F 1/1336; G02F 1/13392; G02F 1/134309; G02F 1/13613; G02F 1/136209;
(Continued)

(56) References Cited

U.S. PATENT DOCUMENTS

| 7,751,667 | B2 | 7/2010 | Daniel et al. |
| 2004/0145696 | A1* | 7/2004 | Oue ................. G09G 3/344 349/167 |
| 2017/0010516 | A1 | 1/2017 | Shiota |

FOREIGN PATENT DOCUMENTS

WO    2015/122083 A1    8/2015

* cited by examiner

*Primary Examiner* — Brandi N Thomas
(74) *Attorney, Agent, or Firm* — Sughrue Mion, PLLC

(57) ABSTRACT

A light distribution control device includes: first upper electrodes and second upper electrodes disposed alternately in a first direction; first lower electrodes and second lower electrodes disposed alternately in a second direction that crosses the first direction; light transmissive regions disposed between an upper electrode set consisting of the first upper electrodes and the second upper electrodes and a lower electrode set consisting of the first lower electrodes and second lower electrodes; and colored electrophoretic particles and a dispersion medium contained in a space between light transmissive regions. Each of the first upper electrodes extends along the space between light transmissive regions. Each of the second upper electrodes extends along a line of light transmissive regions. Each of the first lower electrodes extends along the space between light transmissive regions. Each of the second lower electrodes extends along a line of light transmissive regions.

12 Claims, 24 Drawing Sheets

(51) Int. Cl.
*G02F 1/1685* (2019.01)
*G02F 1/16756* (2019.01)

(58) Field of Classification Search
CPC ............ G02F 1/136277; G02F 1/1677; G02F 1/13324; G02F 1/13338; G02F 1/133524; G02F 1/1362; G02F 1/16757; G02F 1/1679; G02F 1/681; G02F 1/1685; G02F 2001/1678; G02F 2201/124; G02F 2201/44; G02F 2202/36; G02F 1/09; G02F 1/094; G02F 1/133553; G02F 1/16755; G02F 1/1676; G02F 1/16761; H01L 2924/0002; H01L 2924/00; H01L 27/12; H01L 29/24; H01L 29/42356; H01L 29/7869; H01L 27/1214; H01L 27/1225; H01L 27/124; H01L 27/1266; H01L 29/22; H01L 29/78651; H01L 29/78696; H01L 33/0041; H01L 2227/326; H01L 2251/5338; H01L 27/3274; H01L 29/78603; H01L 51/003; H01L 21/02488; H01L 21/02491; H01L 21/02505; H01L 21/02532; H01L 21/02565; H01L 21/02686; H01L 21/2026; H01L 2227/323; H01L 27/283; H01L 27/3244; H01L 27/3258; H01L 28/40; H01L 29/45; H01L 29/4908; H01L 29/495; H01L 29/66969; H01L 51/56; H01L 27/3281; H01L 29/42384; H01L 27/1218; H01L 27/14607; H01L 27/156; H01L 29/66772; H01L 51/5012; H01L 29/41733

See application file for complete search history.

1D HORIZONTALLY NARROW VIEWING ANGLE MODE

RELATION OF POTENTIALS
ELECTRODE 201 = ELECTRODE 202 = ELECTRODE 203 > ELECTRODE 204

RELATION OF POTENTIALS
ELECTRODE 201 = ELECTRODE 202 = ELECTRODE 203 > ELECTRODE 204

1D VERTICALLY NARROW VIEWING ANGLE MODE

RELATION OF POTENTIALS
ELECTRODE 201 = ELECTRODE 203 = ELECTRODE 204 > ELECTRODE 202

1D VERTICALLY NARROW VIEWING ANGLE MODE

RELATION OF POTENTIALS
ELECTRODE 201 = ELECTRODE 203 = ELECTRODE 204 > ELECTRODE 202

2D NARROW VIEWING ANGLE MODE

RELATION OF POTENTIALS
ELECTRODE 201 = ELECTRODE 202 = ELECTRODE 203 = ELECTRODE 204

2D NARROW VIEWING ANGLE MODE

RELATION OF POTENTIALS
ELECTRODE 201 = ELECTRODE 202 = ELECTRODE 203 = ELECTRODE 204

WIDE VIEWING ANGLE MODE

RELATION OF POTENTIALS
ELECTRODE 201 = ELECTRODE 202 < ELECTRODE 203 = ELECTRODE 204

WIDE VIEWING ANGLE MODE

RELATION OF POTENTIALS
ELECTRODE 201 = ELECTRODE 202 < ELECTRODE 203 = ELECTRODE 204

LIGHT DISTRIBUTION CONTROL DEVICE AND ELECTRONIC DEVICE

CROSS-REFERENCE TO RELATED APPLICATIONS

This Non-provisional application claims priority under 35 U.S.C. § 119(a) on Patent Application No. 2018-199435 filed in Japan on Oct. 23, 2018 and Patent Application No. 2019-110965 filed in Japan on Jun. 14, 2019, the entire contents of which are hereby incorporated by reference.

BACKGROUND

This disclosure relates to a light distribution control device and an electronic device.

Display devices are used in various information processing apparatuses such as mobile phones, personal digital assistants (PDAs), automatic teller machines (ATMs), and personal computers. In recent years, display devices providing a wide viewable range have been commercialized.

Examples of such display devices include liquid crystal display devices and organic light-emitting diode (OLED) display devices. From the viewpoint of information leakage, there is a demand to restrict the viewable range to prevent peeking or a demand not to distribute light in unnecessary directions. As an optical element meeting this demand, an optical film capable of restricting the viewable range (or the range of outgoing light) of a display device has been proposed and commercialized.

A liquid crystal display device with this optical film requires removing the optical film each time when people want to see the display from multiple directions together. Because of this bothersome operation and waste of time for the user, there is an increasing demand to easily attain a wide viewable range state or a narrow viewable range state without the bothersome operation of removing/attaching the film.

To meet this demand, a light distribution control element capable of switching the viewable range of the display device between a wide viewing angle and a narrow viewing angle has been proposed. The art related to such a light distribution control element includes U.S. Pat. No. 7,751,667 B and WO 2015/122083 A.

SUMMARY

An aspect of this disclosure is a light distribution control device configured to control an angle range to transmit light. The light distribution control device includes: first upper electrodes and second upper electrodes disposed alternately in a first direction; first lower electrodes and second lower electrodes disposed alternately in a second direction that crosses the first direction; light transmissive regions disposed between an upper electrode set consisting of the first upper electrodes and the second upper electrodes and a lower electrode set consisting of the first lower electrodes and second lower electrodes; and colored electrophoretic particles and a dispersion medium contained in a space between light transmissive regions. Each of the first upper electrodes extends along the space between light transmissive regions. Each of the second upper electrodes extends along a line of light transmissive regions. Each of the first lower electrodes extends along the space between light transmissive regions. Each of the second lower electrodes extends along a line of light transmissive regions.

It is to be understood that both the foregoing general description and the following detailed description are exemplary and explanatory and are not restrictive of this disclosure.

EMBODIMENTS

Figure 1A:
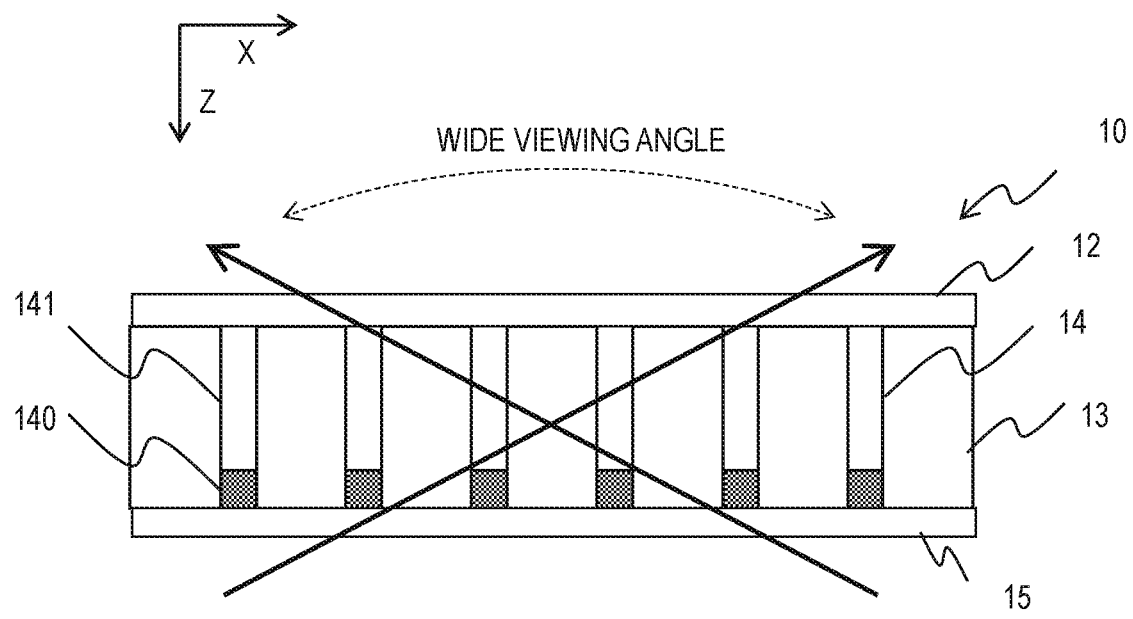
FIG. 1A is a cross-sectional diagram of a light distribution control panel in a wide viewing angle state.

Hereinafter, embodiments of this disclosure are described with reference to the accompanying drawings. It should be noted that the embodiments are merely examples to implement this disclosure and not to limit the technical scope of this disclosure. The elements common to drawings are assigned the same reference signs. The shapes of the elements in the drawings do not necessarily reflect the actual sizes or proportions. In each drawing, only one or more of the same kind of elements may be provided with reference signs.

Operating Principle of Light Distribution Control Panel

Figure 1B:
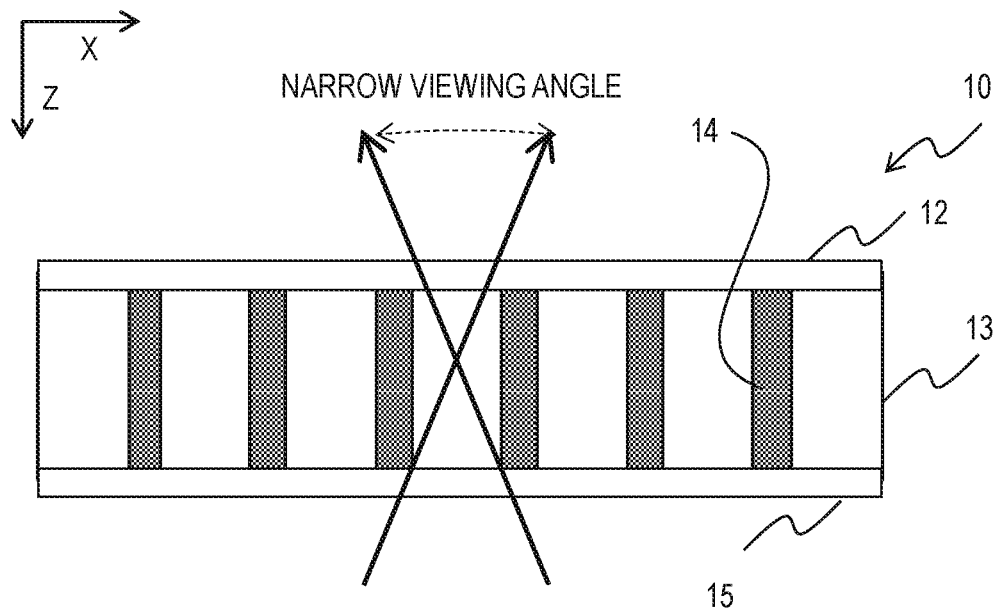
FIG. 1B is a cross-sectional diagram of a light distribution control panel in a narrow viewing angle state.

FIGS. 1A and 1B are cross-sectional diagrams schematically illustrating the operating principle of a light distribution control panel (an example of the light distribution control device). The light distribution control panel controls the angle range to transmit light. FIG. 1A is a cross-sectional diagram of a light distribution control panel 10 in a wide viewing angle state. FIG. 1B is a cross-sectional diagram of the light distribution control panel 10 in a narrow viewing angle state. The X-axis is parallel to the principal surface (the surface from which the light goes out) of the light distribution control panel 10 and the Z-axis is perpendicular to the X-axis and parallel to the layering direction.

The light distribution control panel 10 is mounted on a display device, for example. The light distribution control panel 10 is disposed on the front of the display panel or between the backlight unit and the display panel. The light distribution control panel 10 changes the viewing angle of the display device by switching between a wide viewing angle state and a narrow viewing angle state.

In the following description, the side on which the image is seen by the user or the side toward which the light travels is referred to as front side and the opposite side as back side. In the layered structure of the light distribution control panel 10, the front side is referred to as upper side and the back side as lower side. The light distribution control panel 10 is also applicable to a device different from a display device, such as a dimmer of an illumination device.

As illustrated in FIGS. 1A and 1B, the light distribution control panel 10 includes electrodes 12 and 15. As will be described later, the light distribution control panel 10 in this embodiment includes electrodes having a specific configuration. The electrodes 12 and 15 in FIGS. 1A and 1B are simplified to explain the general operation of the light distribution control panel 10.

Light transmissive regions 13 and a transmitted light control region 14 are provided between the electrodes 12 and 15 opposed to each other. The light transmissive regions 13 are made of a transparent material such as transparent resin. The transmitted light control region 14 is a region other than the light transmissive regions 13 and is composed of a plurality of grooves formed between light transmissive regions 13. The transmitted light control region 14 contains colored electrophoretic particles 140 and their dispersion medium 141. The electrophoretic particles 140 are colored in black, for example, and positively or negatively charged.

As mentioned above, FIG. 1A illustrates a wide viewing angle state. The electrophoretic particles 140 are gathered around the electrode 15. FIG. 1B illustrates a narrow viewing angle state. The electrophoretic particles 140 are substantially equally dispersed within the dispersion medium 141 (the transmitted light control region 14). The light distribution control panel 10 changes the dispersion state of the electrophoretic particles 140 to change the viewing angle in which a displayed image can be observed, between a narrow viewing angle and a wide viewing angle.

As mentioned above, the electrophoretic particles 140 are positively or negatively charged. The light distribution control panel 10 applies an electric field between the transparent electrodes 12 and 15 to gather the electrophoretic particles 140 to one of the electrodes, which is the electrode 15 in the example of FIG. 1A, attaining a wide viewing angle state. In the case where the electrophoretic particles 140 are negatively charged, the electrophoretic particles 140 get away from the electrode (negative electrode) having a lower potential to gather around the electrode (positive electrode) having a higher potential. When no electric field exists between the transparent electrodes 12 and 15, however, the electrophoretic particles 140 disperse in the dispersion medium 141 because of the repulsive forces of the electrophoretic particles 140, attaining a narrow viewing angle state.

Viewing Angle Modes

Figure 2:
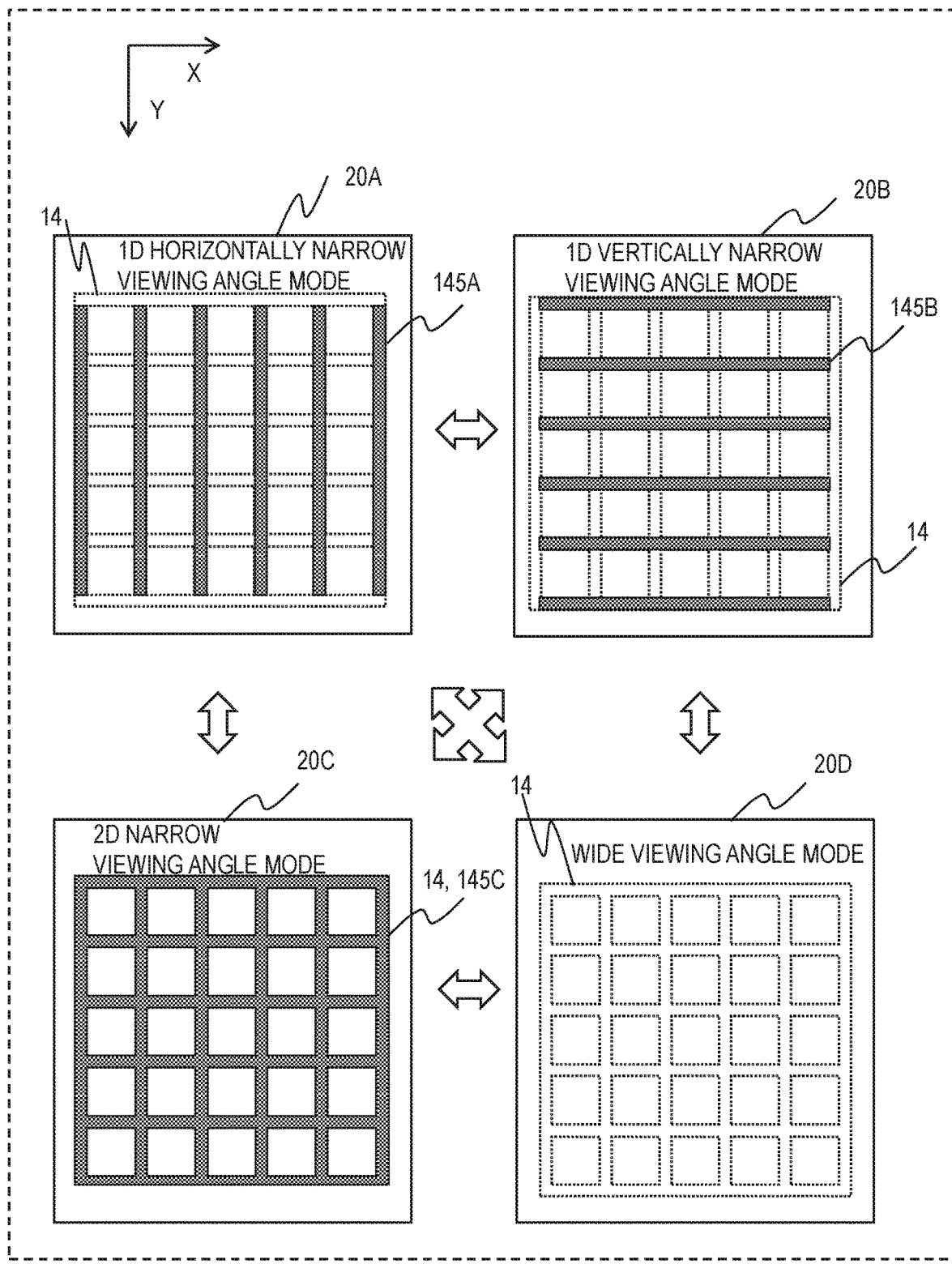
FIG. 2 illustrates different viewing angle modes available in a light distribution control panel.

FIG. 2 illustrates different modes (viewing angle modes) available in the light distribution control panel 10 in this embodiment. The light distribution control panel 10 in this embodiment can control the angle range of the transmitted light along multiple axes. Specifically, the light distribution control panel 10 can be changed from any one of the four modes 20A to 20D illustrated in FIG. 2 to any other mode.

In FIG. 2, the Y-axis is parallel to the principal surface of the light distribution control panel 10 and perpendicular to the X-axis. In the example of FIG. 2, the transmitted light control region 14 includes grooves extending along the X-axis and disposed to be distant from one another along the Y-axis and grooves extending along the Y-axis and disposed to be distant from one another along the X-axis.

In the mode 20A, the viewable range (viewing angle) of the light distribution control panel 10 is narrow in the horizontal directions (the directions along the X-axis) in FIG. 2 and wide in the vertical directions (the directions along the Y-axis) in FIG. 2. In other words, the light distribution control panel 10 is in a narrow viewing angle state in the horizontal directions and a wide viewing angle state in the vertical directions. This mode is called 1D horizontally narrow viewing angle mode (first mode).

In the mode 20A, a part of the transmitted light control region 14 is in a light absorbing state and the remaining part is in a light transmissive state. In FIG. 2, a plurality of light absorbers 145A are disposed to be distant from one another in the horizontal directions and extend straight in the vertical directions.

In the mode 20B, the viewable range (viewing angle) of the light distribution control panel 10 is narrow in the vertical directions in FIG. 2 and wide in the horizontal directions in FIG. 2. In other words, the light distribution control panel 10 is in a narrow viewing angle state in the vertical directions and a wide viewing angle state in the horizontal directions. This mode is called 1D vertically narrow viewing angle mode (second mode).

In the mode 20B, a part of the transmitted light control region 14 is in a light absorbing state and the remaining part is in a light transmissive state. In FIG. 2, a plurality of light absorbers 145B are disposed to be distant from one another in the vertical directions and extend straight in the horizontal directions.

In the mode 20C, the viewable range (viewing angle) of the light distribution control panel 10 is narrow in the vertical directions and the horizontal directions in FIG. 2. In other words, the light distribution control panel 10 is in a narrow viewing state in the vertical directions and the horizontal directions. This mode is called 2D narrow viewing angle mode (third mode). In the mode 20C, the entire transmitted light control region 14 is in a light absorbing state, that is, a light absorber 145C. The light absorber 145C has a shape of a grid that is composed of light absorbers 145A and 145B.

In the mode 20D, the viewable range (viewing angle) of the light distribution control panel 10 is wide in both the vertical directions and the horizontal directions (any directions). In other words, the light distribution control panel 10 is in a wide viewing angle state in the vertical directions and the horizontal directions. This mode is called 2D wide viewing angle mode (fourth mode). In the mode 20D, the entire transmitted light control region 14 is in a light transmissive state.

Configuration of Light Distribution Control Panel

Figure 3A:
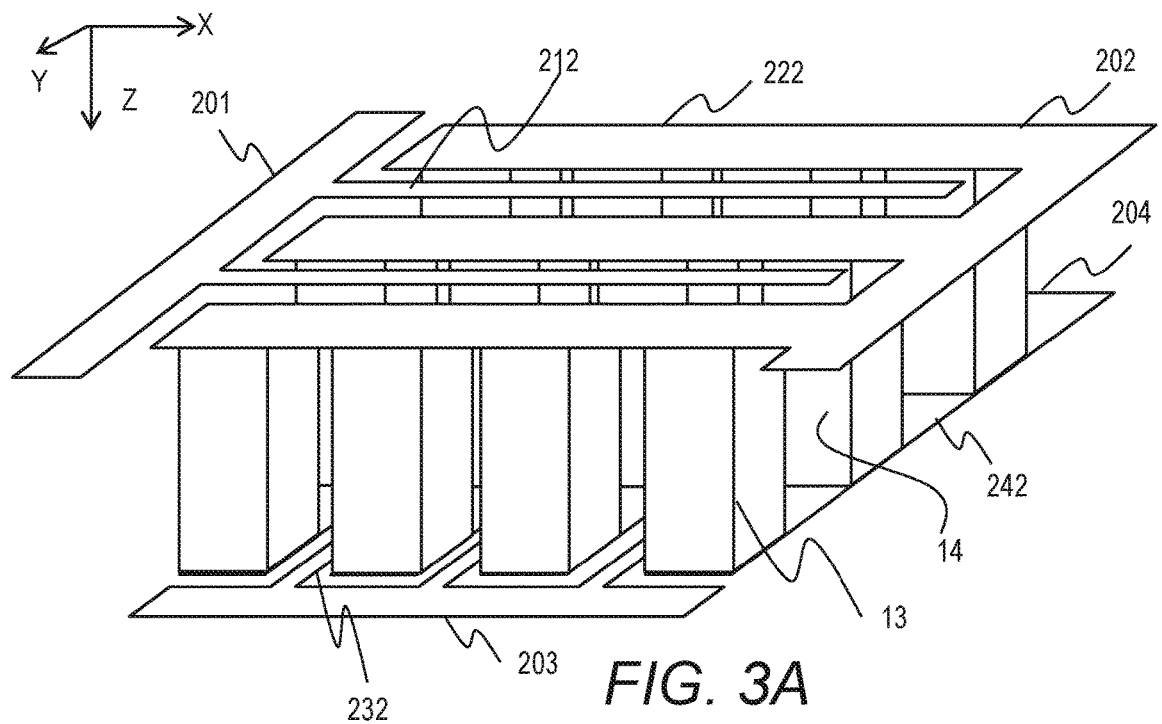
FIG. 3A is a perspective diagram schematically illustrating a configuration of upper comb electrodes, lower comb electrodes, and light transmissive regions in a light distribution control panel.
Figure 3B:
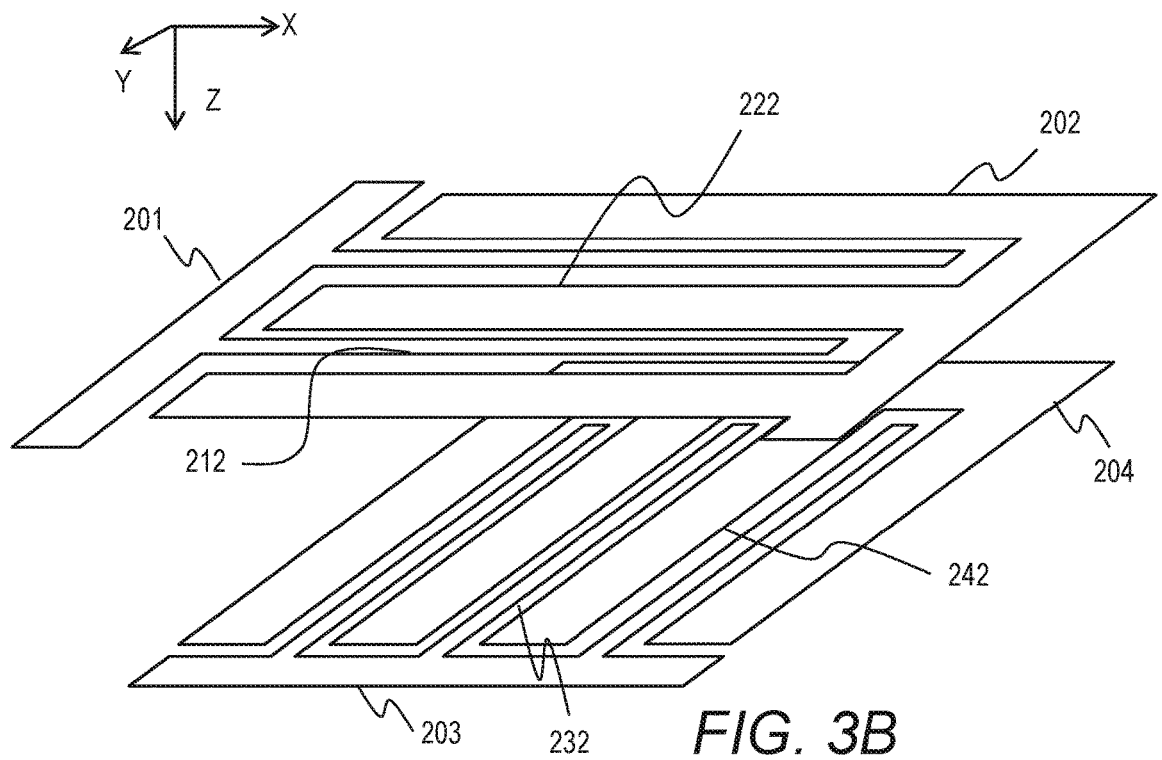
FIG. 3B is a perspective diagram schematically illustrating the configuration of the upper comb electrodes and the lower comb electrodes in FIG. 3A.
Figure 3C:
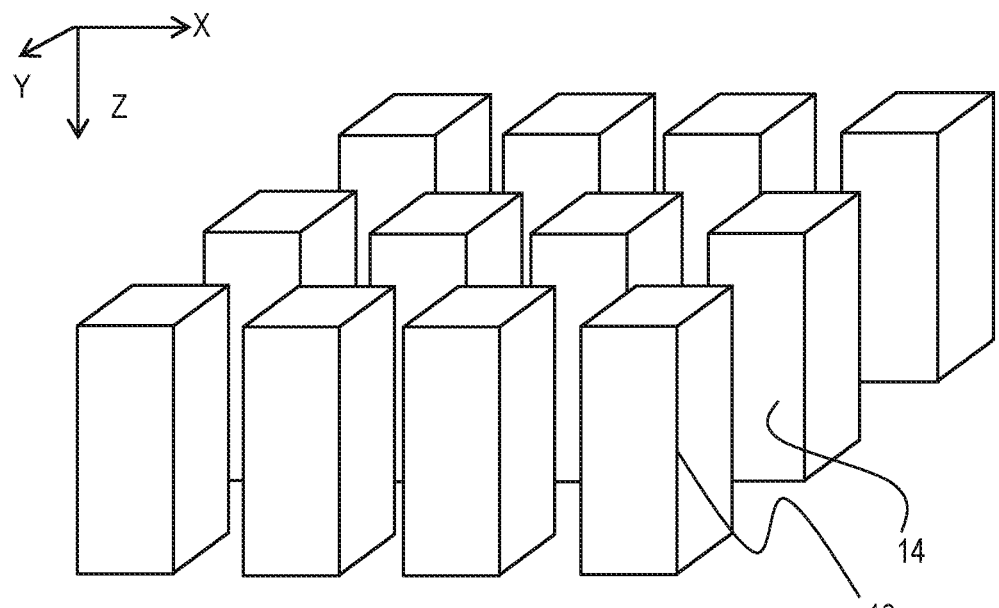
FIG. 3C is a perspective diagram schematically illustrating the configuration of the light transmissive regions in FIG. 3A.
Figure 3D:
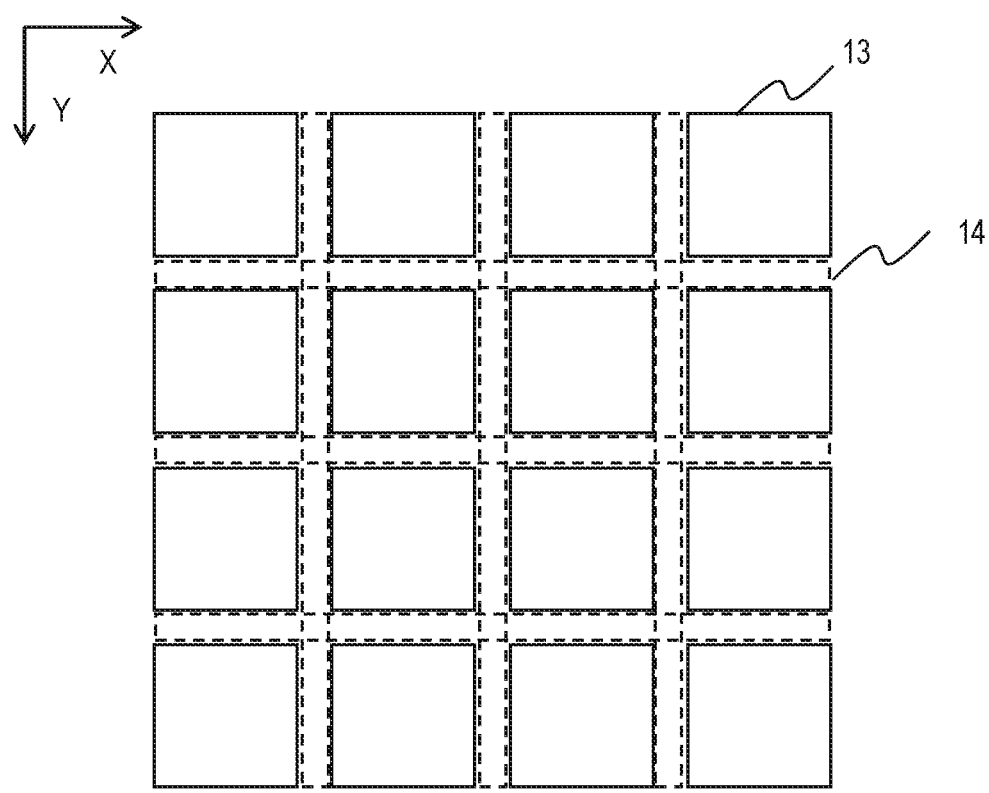
FIG. 3D is a plan diagram schematically illustrating the configuration of the light transmissive regions in FIG. 3A.

FIG. 3A is a perspective diagram schematically illustrating a configuration of upper comb electrodes, lower comb electrodes, and light transmissive regions in the light distribution control panel 10. FIG. 3B is a perspective diagram schematically illustrating the configuration of the upper comb electrodes and the lower comb electrodes in FIG. 3A. FIGS. 3C and 3D are a perspective diagram and a plan diagram (top view), respectively, illustrating the configuration of the light transmissive regions in FIG. 3A.

The light distribution control panel 10 includes a first upper comb electrode (conductive film pattern) 201, a second upper comb electrode (conductive film pattern) 202, a first lower comb electrode (conductive film pattern) 203, and a second lower comb electrode (conductive film pattern) 204.

The first upper comb electrode 201 and the second upper comb electrode 202 are electrodes on the front side (light exit side). The first lower comb electrode 203 and the second lower comb electrode 204 are electrodes on the back side (light entrance side). A plurality of light transmissive regions 13 and a transmitted light control region 14 of the gaps therebetween are sandwiched by an upper comb electrode set and a lower comb electrode set. The first upper comb electrode 201 and the second upper comb electrode 202 are included in the upper comb electrode set. The first lower comb electrode 203 and the second lower comb electrode 204 are included in the lower comb electrode set.

The first upper comb electrode 201, the second upper comb electrode 202, the first lower comb electrode 203, and the second lower comb electrode 204 can be transparent electrodes. In the configuration example illustrated in FIGS. 3A and 3B, the first upper comb electrode 201, the second upper comb electrode 202, the first lower comb electrode 203, and the second lower comb electrode 204 have shapes like a comb.

The first upper comb electrode 201 and the second upper comb electrode 202 are opposed along the X-axis. Their teeth (electrodes) 212 and 222 are disposed to extend along the X-axis (in the first directions) and alternate along the Y-axis. As will be described later, the teeth 212 and 222 are electrodes to generate an electric field for electrophoretic particles 140.

The first lower comb electrode 203 and the second lower comb electrode 204 are opposed along the Y-axis. Their teeth (electrodes) 232 and 242 are disposed to extend along the Y-axis (in the second directions) and alternate along the X-axis. As will be described later, the teeth 232 and 242 are electrodes to generate an electric field for electrophoretic particles 140.

The teeth 212 and 222 are upper electrodes and included in the upper electrode set. For example, the teeth 212 are first upper electrodes and the teeth 222 are second upper electrodes. The teeth 232 and 242 are lower electrodes and included in the lower electrode set. For example, the teeth 232 are first lower electrodes and the teeth 242 are second lower electrodes.

Each tooth 212 of the first upper comb electrode 201 extends along the transmitted light control region 14. Each tooth 222 of the second upper comb electrode 202 extends along a line (row) of light transmissive regions 13. Each tooth 232 of the first lower comb electrode 203 extends along the transmitted light control region 14. Each tooth 242 of the second lower comb electrode 204 extends along a line (column) of light transmissive regions 13.

Each light transmissive region 13 is a region transparent for visible light and can be a column made of transparent resin. As illustrated in FIGS. 3A, 3C, and 3D, a plurality of light transmissive regions 13 are disposed in a matrix. In this example, each light transmissive region 13 is a column whose top and bottom faces are square. The region of the gaps between light transmissive regions 13 is the transmitted light control region 14, which is filled with electrophoretic material including a dispersion medium 141 and electrophoretic particles 140.

In the example illustrated in FIGS. 3A, 3C, and 3D, the light transmissive regions 13 have the identical shapes and they are disposed at a regular pitch in the horizontal direction and the vertical direction. The pattern of the light transmissive regions 13 in a planar view is not limited to the example illustrated in FIG. 3D. For example, the top and the bottom faces of each light transmissive region 13 can have a circular shape or a polygonal shape having five or more vertices and desired lengths of sides. Some of the light transmissive regions 13 can have a shape different from the other light transmissive regions 13. The light-transmissive regions 13 can be disposed in a zig-zag manner.

Figure 4A:
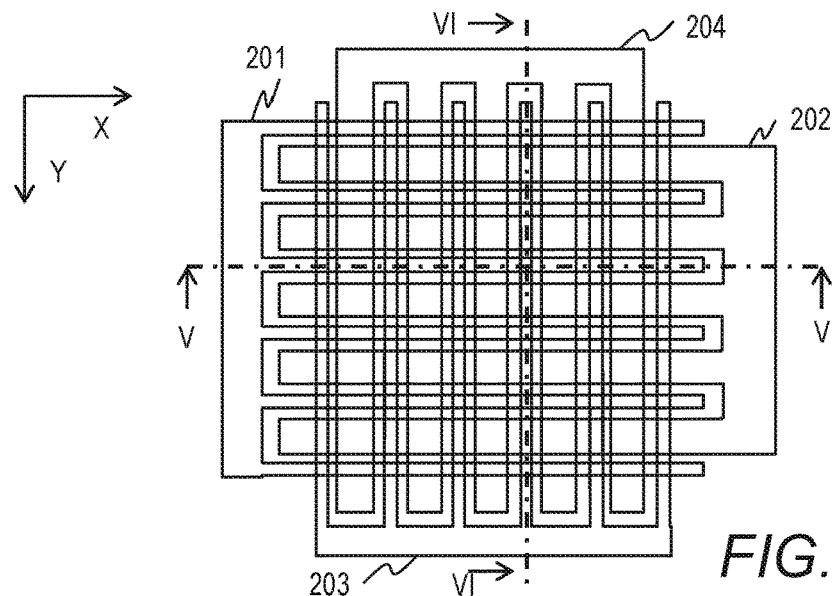
FIG. 4A is a plan diagram schematically illustrating a first upper comb electrode, a second upper comb electrode, a first lower comb electrode, and a second lower comb electrode.
Figure 4B:
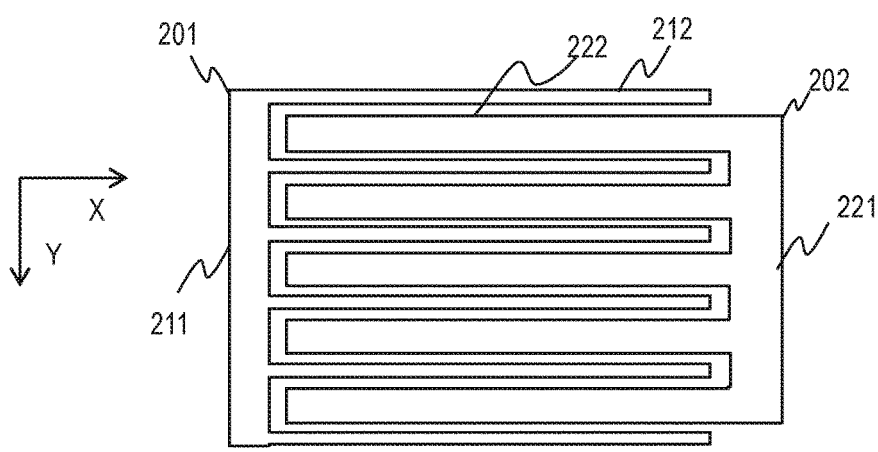
FIG. 4B is a plan diagram illustrating the first upper comb electrode and the second upper comb electrode in FIG. 4A.
Figure 4C:
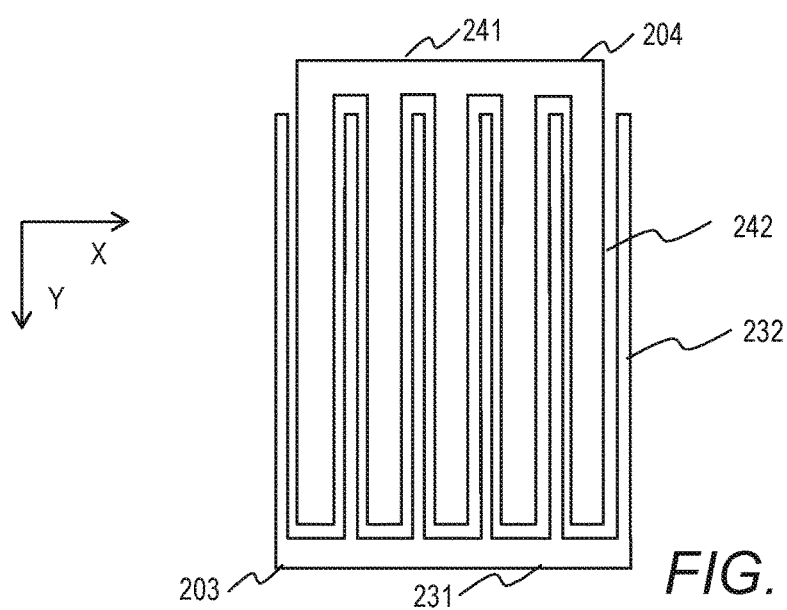
FIG. 4C is a plan diagram illustrating the first lower comb electrode and the second lower comb electrode in FIG. 4A.

FIG. 4A is a plan diagram schematically illustrating the first upper comb electrode 201, the second upper comb electrode 202, the first lower comb electrode 203, and the second lower comb electrode 204. FIG. 4B is a plan diagram illustrating the first upper comb electrode 201 and the second upper comb electrode 202 in FIG. 4A. FIG. 4C is a plan diagram illustrating the first lower comb electrode 203 and the second lower comb electrode 204 in FIG. 4A.

The first upper comb electrode 201 includes teeth 212 disposed to be distant from one another along the Y-axis and a connector 211 connecting the teeth 212. The teeth 212 have the identical shapes and are disposed at a regular pitch. The connector 211 extends along the Y-axis. Each tooth 212 extends along the X-axis from the connector 211 toward the opposite second upper comb electrode 202. The teeth 212 are straight.

The first upper comb electrode 201 is one unseparated transparent conductive film; the teeth 212 and the connector 211 are parts thereof. Each tooth 212 is also referred to as electrode. The connector 211 can be omitted and the potentials of the teeth 212 may be controlled individually. The teeth 212 do not need to have identical shapes or be disposed at equal intervals.

The second upper comb electrode 202 includes teeth 222 disposed to be distant from one another along the Y-axis and a connector 221 connecting the teeth 222. The teeth 222 have the identical shapes and are disposed at a regular pitch. The connector 221 extends along the Y-axis. Each tooth 222 extends along the X-axis from the connector 221 toward the opposite first upper comb electrode 201. The teeth 222 are straight.

The second upper comb electrode 202 is one unseparated transparent conductive film; the teeth 222 and the connector 221 are parts thereof. Each tooth 222 is also referred to as electrode. The connector 221 can be omitted and the potentials of the teeth 222 may be controlled individually. The teeth 222 do not need to have identical shapes or be disposed at equal intervals.

The teeth 212 of the first upper comb electrode 201 and the teeth 222 of the second upper comb electrode 202 are disposed alternately along the Y-axis. As described above, each tooth 212 extends along the transmitted light control region 14 and each tooth 222 extends along a row of light transmissive regions 13.

The first lower comb electrode 203 includes teeth 232 disposed to be distant from one another along the X-axis and a connector 231 connecting the teeth 232. The teeth 232 have the identical shapes and are disposed at a regular pitch. The connector 231 extends along the X-axis. Each tooth 232 extends along the Y-axis from the connector 231 toward the opposite second lower comb electrode 204. The teeth 232 are straight.

The first lower comb electrode 203 is one unseparated transparent conductive film; the teeth 232 and the connector 231 are parts thereof. Each tooth 232 is also referred to as electrode. The connector 231 can be omitted and the potentials of the teeth 232 may be controlled individually. The teeth 232 do not need to have identical shapes or be disposed at equal intervals.

The second lower comb electrode 204 includes teeth 242 disposed to be distant from one another along the X-axis and a connector 241 connecting the teeth 242. The teeth 242 have the identical shapes and are disposed at a regular pitch. The connector 241 extends along the X-axis. Each tooth 242 extends along the Y-axis from the connector 241 toward the opposite first lower comb electrode 203. The teeth 242 are straight.

The second lower comb electrode 204 is one unseparated transparent conductive film; the teeth 242 and the connector 241 are parts thereof. Each tooth 242 is also referred to as electrode. The connector 241 can be omitted and the potentials of the teeth 242 may be controlled individually. The teeth 242 do not need to have identical shapes or be disposed at equal intervals.

The teeth 232 of the first lower comb electrode 203 and the teeth 242 of the second upper comb electrode 204 are disposed alternately along the X-axis. As described above, each tooth 232 extends along the transmitted light control region 14 and each tooth 242 extends along a column of light transmissive regions 13.

Although each tooth 212 of the first upper comb electrode 201 and each tooth 232 of the first lower comb electrode 203 in this example are straight, they can be curved and extend along the transmitted light control region 14. Although each tooth 222 of the second upper comb electrode 202 and each tooth 242 of the second lower comb electrode 204 in this example are straight, they can be curved and extend along a curve line of light transmissive regions 13.

Figure 5:
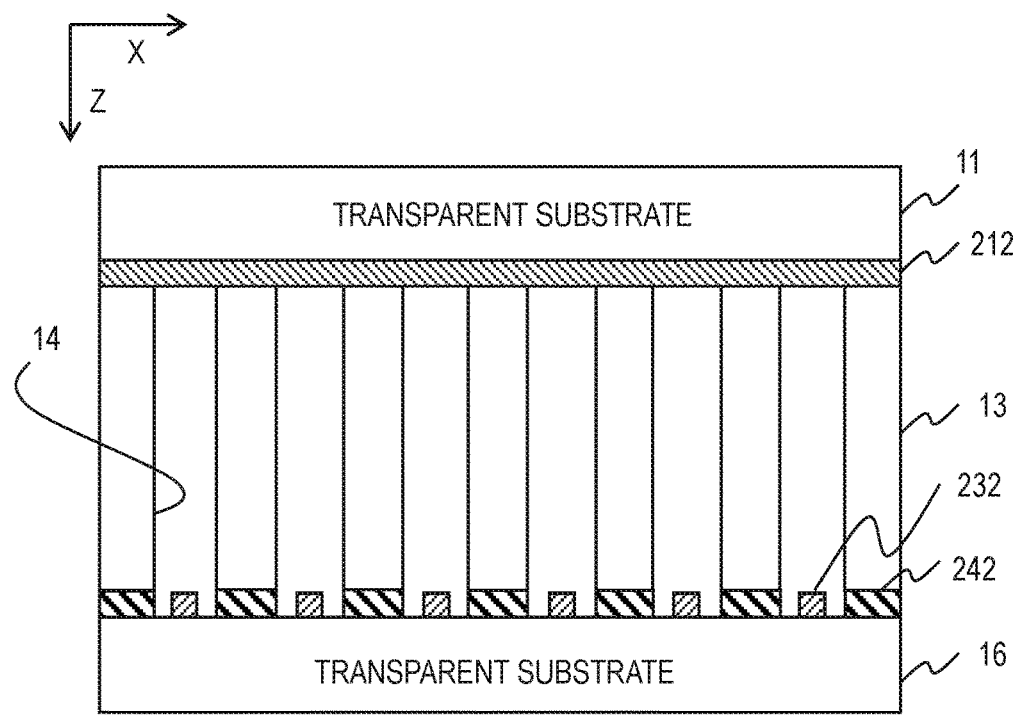
FIG. 5 schematically illustrates a cross-sectional structure of the light distribution control panel cut along the line V-V in FIG. 4A.

FIG. 5 schematically illustrates a cross-sectional structure of the light distribution control panel 10 cut along the line V-V in FIG. 4A. The electrophoretic particles 140 and their dispersion medium 141 are omitted in FIG. 5. The light distribution control panel 10 includes transparent substrates 11 and 16 opposed to each other. In this example, the transparent substrate 11 is on the front and the transparent substrate 16 is on the back. The transparent substrate 11 can be on the back and the transparent substrate 16 can be on the front. The X-axis is parallel to the principal surfaces of the transparent substrates 11 and 16. The Z-axis is parallel to the normal to the principal surfaces of the transparent substrates 11 and 16.

The typical shapes of the transparent substrates 11 and 16 are tetragons, but they can be any shapes. The material of the transparent substrates 11 and 16 can be glass, polyethylene terephthalate (PET), polycarbonate (PC), polyethylene naphthalate (PEN), or cycloolefin polymer (COP).

The teeth 232 of the first lower comb electrode 203 and the teeth 242 of the second lower comb electrode 204 are disposed alternately along the X-axis on the surface of the transparent substrate 16 that is facing the transparent substrate 11. The teeth 232 and 242 are formed on the same layer in the laminate of the light distribution control panel 10. For example, the teeth 232 and 242 are made of the same material and patterned simultaneously.

Each tooth 232 overlaps the transmitted light control region 14 when seen along the Z-axis. Each tooth 242 overlaps the light transmissive regions 13 when seen along the Z-axis. The pitch of the teeth 232 is the same as the pitch of the grooves forming the transmitted light control region 14 and the width of the teeth 232 is narrower than the width of the grooves. The pitch of the teeth 242 is the same as the pitch of the light transmissive regions 13 and the width of the teeth 242 is equal to the width (the length along the X-axis) of the light transmissive regions 13.

The first lower comb electrode 203 and the second lower comb electrode 204 can be made of a film of indium tin oxide (ITO), ZnO, indium gallium zinc oxide (IGZO), or metallic nanowires. The film thickness of the teeth 232 and 242 can be 10 nm to 1000 nm.

The light transmissive regions 13 can be made of a transparent material that transmits light, such as photosensitive resin. The height of the light transmissive regions 13 can be 3 µm to 300 µm. The length along the X-axis of the light transmissive regions 13 can be 1 µm to 150 µm and the distance between light transmissive regions 13 adjacent to each other along the X-axis can be 0.25 µm to 40 µm.

The teeth 232 or 242 can be covered with an insulating film within the transmitted light control region 14. The insulating film can be made of $SiO_2$, for example. The insulating film prevents the electrophoretic particles 140 from sticking to the teeth 232 or 242.

The teeth 212 of the first upper comb electrode 201 extend along the X-axis on the surface of the transparent substrate 11 that is facing the transparent substrate 16. The first upper comb electrode 201 (the teeth 212) can be made of the same material and have the same film thickness as the first lower comb electrode 203 (the teeth 232).

Figure 6:
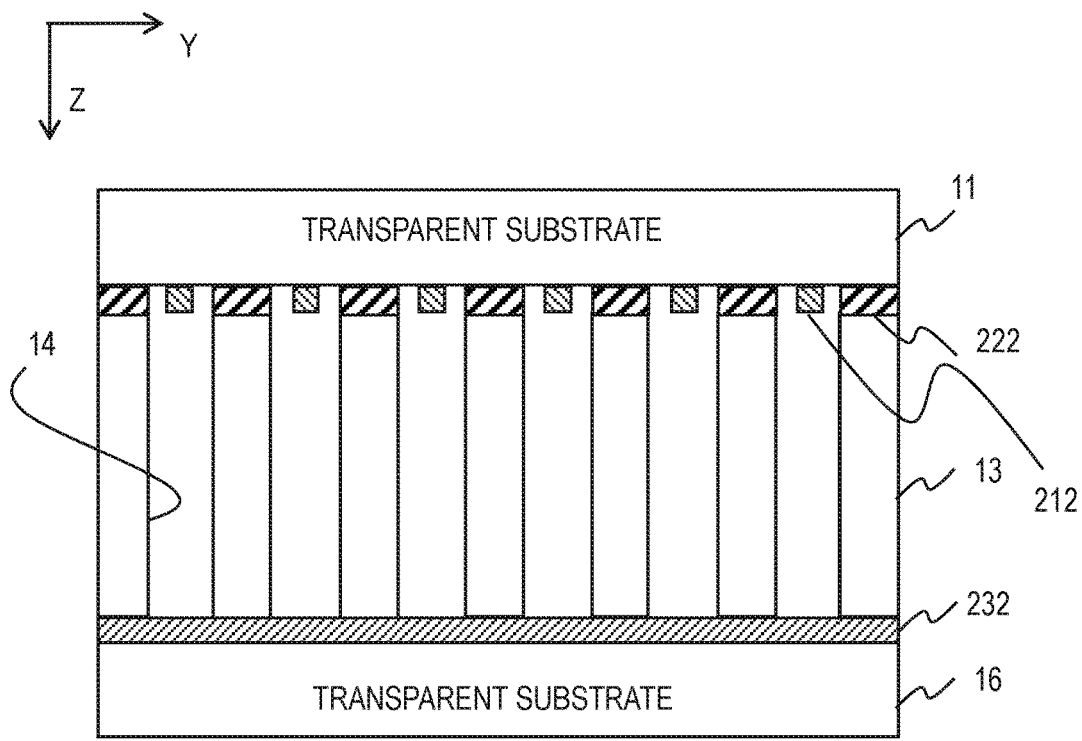
FIG. 6 schematically illustrates a cross-sectional structure of the light distribution control panel cut along the line VI-VI in FIG. 4A.

FIG. 6 schematically illustrates a cross-sectional structure of the light distribution control panel 10 cut along the line VI-VI in FIG. 4A. The electrophoretic particles 140 and their dispersion medium 141 are omitted in FIG. 6. The Y-axis is parallel to the principal surfaces of the transparent substrates 11 and 16.

The teeth 232 of the first lower comb electrode 203 extend along the Y-axis on the surface of the transparent substrate 16 that is facing the transparent substrate 11. The teeth 212 of the first upper comb electrode 201 and the teeth 222 of the second upper comb electrode 202 are disposed alternately along the Y-axis on the surface of the transparent substrate 11 opposed to the transparent substrate 16. The teeth 212 and 222 are formed on the same layer in the laminate of the light distribution control panel 10. For example, the teeth 212 and 222 are made of the same material and patterned simultaneously.

Each tooth 212 overlaps the transmitted light control region 14 when seen along the Z-axis. Each tooth 222 overlaps the light transmissive regions 13 when seen along the Z-axis. The pitch of the teeth 212 is the same as the pitch of the grooves forming the transmitted light control region 14 and the width of the teeth 212 is narrower than the width of the grooves. The pitch of the teeth 222 is the same as the pitch of the light transmissive regions 13 and the width of the teeth 222 is equal to the width (the length along the Y-axis) of the light transmissive regions 13.

The second upper comb electrode 202 (the teeth 222) can be made of the same material and have the same film thickness as the second lower comb electrode 204 (the teeth 242). The length along the Y-axis of the light transmissive regions 13 can be 1 µm to 150 µm and the distance between light transmissive regions 13 adjacent to each other along the Y-axis can be 0.25 µm to 40 µm.

The teeth 212 or 222 can be covered with an insulating film within the transmitted light control region 14. The insulating film can be made of $SiO_2$, for example. The insulating film prevents the electrophoretic particles 140 from sticking to the teeth 212 or 222.

Relation Among Electrode Potentials in Each Viewing Angle Mode

Figure 7:
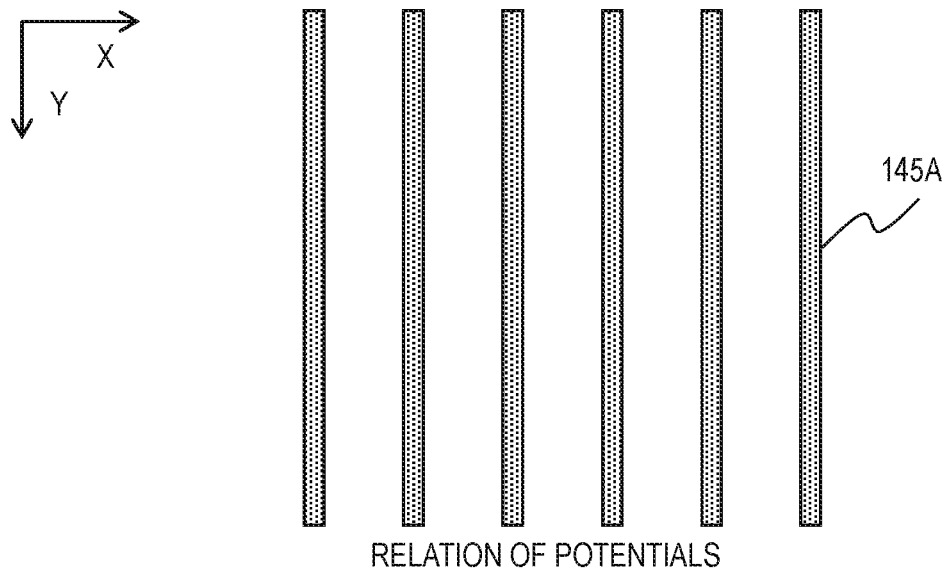
FIG. 7 is a plan diagram of light absorbers in a 1D horizontally narrow viewing angle mode.
Figure 8:
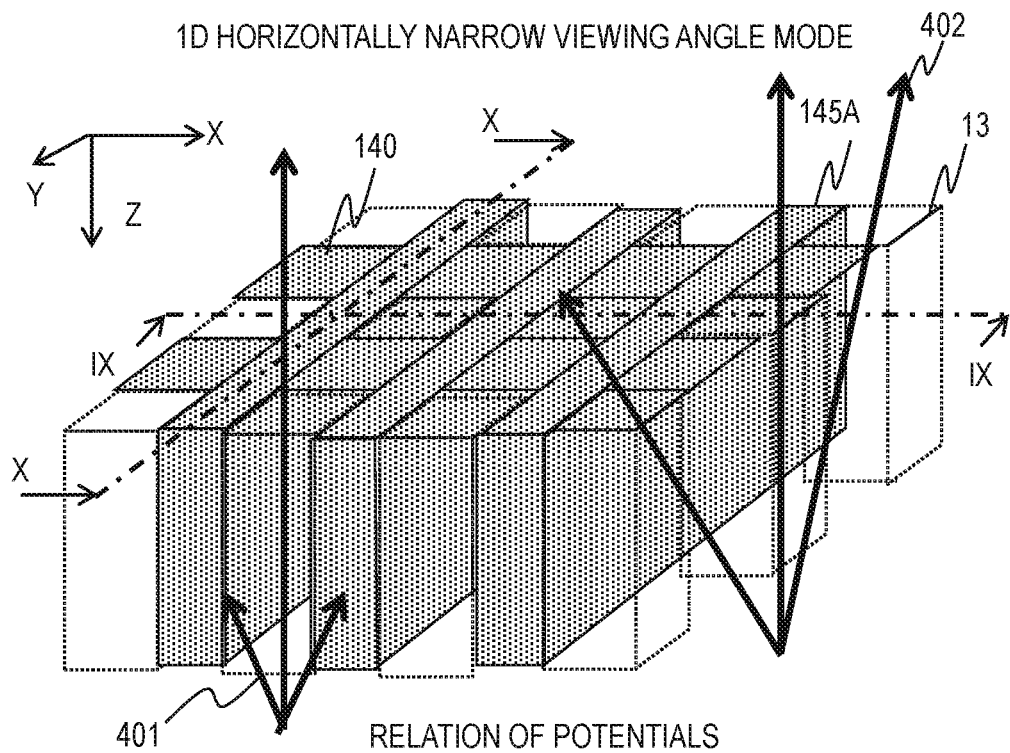
FIG. 8 is a perspective diagram of light absorbers in the 1D horizontally narrow viewing angle mode.
Figure 9:
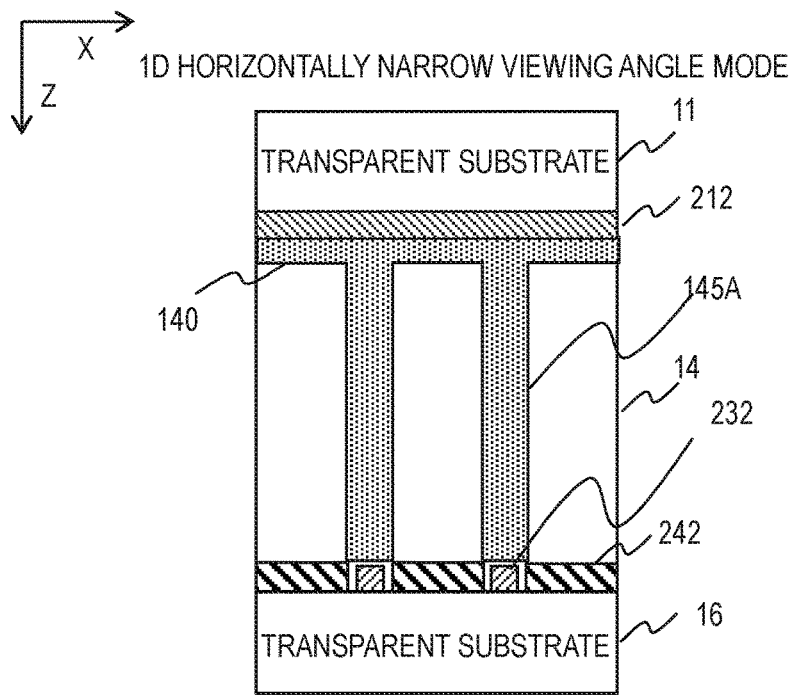
FIG. 9 is a cross-sectional diagram of the light distribution control panel cut along the line IX-IX in FIG. 8.
Figure 10:
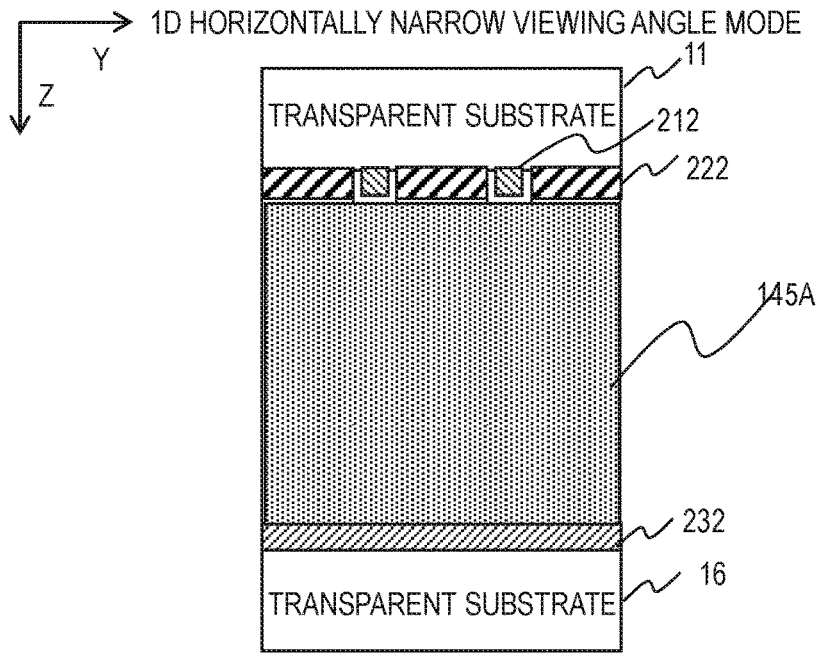
FIG. 10 is a cross-sectional diagram of the light distribution control panel cut along the line X-X in FIG. 8.

Hereinafter, relations among electrode potentials in each viewing angle mode available in the light distribution control panel 10 are described. Assume that the electrophoretic particles 140 are negatively charged. First, the 1D horizontally narrow viewing angle mode is described. FIG. 7 is a plan diagram of the light absorbers 145A in the 1D horizontally narrow viewing angle mode. FIG. 8 is a perspective diagram of the light absorbers 145A in the 1D horizontally narrow viewing angle mode. FIG. 9 is a cross-sectional diagram of the light distribution control panel 10 cut along the line IX-IX in FIG. 8. FIG. 10 is a cross-sectional diagram of the light distribution control panel 10 cut along the line X-X in FIG. 8.

An example of the relation among the electrode potentials in the 1D horizontally narrow viewing angle mode is as follows. The potentials of the first upper comb electrode 201, the second upper comb electrode 202, and the first lower comb electrode 203 are the same. The potentials of these electrodes are higher than the potential of the second lower comb electrode 204. In other words, the potentials of the teeth 212, 222, and 232 are the same and they are higher than the potentials of the teeth 242.

The light absorbers 145A extend along the Y-axis and are distant from one another along the X-axis in the 1D horizontally narrow viewing angle mode. The light 401 expanding in the horizontal directions (the directions along the X-axis) is absorbed by the light absorbers 145A to attain a narrow viewing angle state in the horizontal directions. However, the light 402 expanding in the vertical directions (the directions along the Y-axis) passes through the light distribution control panel 10 without being absorbed by the light absorbers 145A to attain a wide viewing angle state in the vertical directions.

As illustrated in FIGS. 9 and 10, the light absorbers 145A are generated between the teeth 232 of the first lower comb electrode 203 and the teeth 212 of the first upper comb electrode 201 and between the teeth 232 of the first lower comb electrode 203 and the teeth 222 of the second upper comb electrode 202. Since the potentials of the teeth 212, 222, and 232 are equal, the electrophoretic particles 140 disperse between the teeth 232 and 212 and between the teeth 232 and 222.

However, the potentials of the teeth 242 of the second lower comb electrode 204 are lower than the potentials of the teeth 212 of the first upper comb electrode 201. Accordingly, as illustrated in FIG. 9, the electrophoretic particles 140 between the teeth 212 and 242 gather around the teeth 212; the transmitted light control region 14 (the electrophoretic particles 140) there is in a light transmissive state. The spaces sandwiched by the teeth 222 of the second upper comb electrode 202 and the teeth 242 of the second lower comb electrode 204 are filled with light transmissive regions 13; there are no electrophoretic particles 140.

The potential of the second lower comb electrode 204 (the teeth 242) can be higher than the potentials of the other electrodes 201, 202, and 203 (the other teeth 212, 222, and 232). In that case, the electrophoretic particles 140 gather around the second lower comb electrode 204 (the teeth 242).

Figure 11:
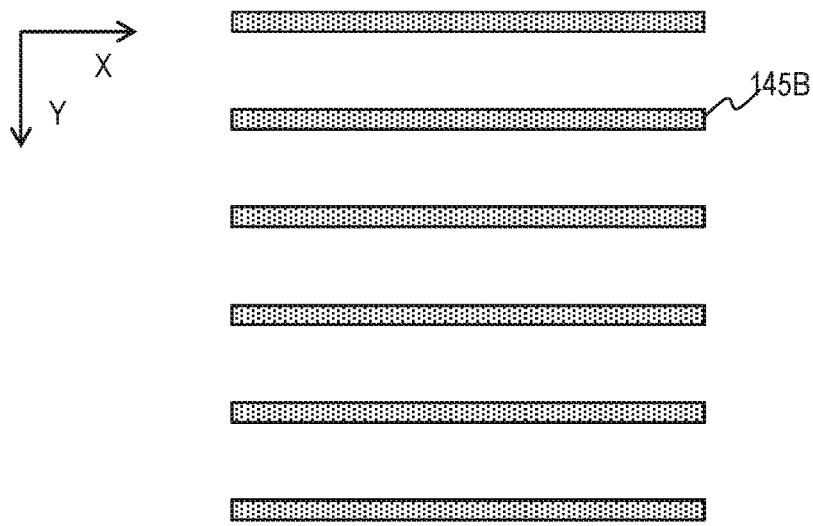
FIG. 11 is a plan diagram of light absorbers in a 1D vertically narrow viewing angle mode.
Figure 12:
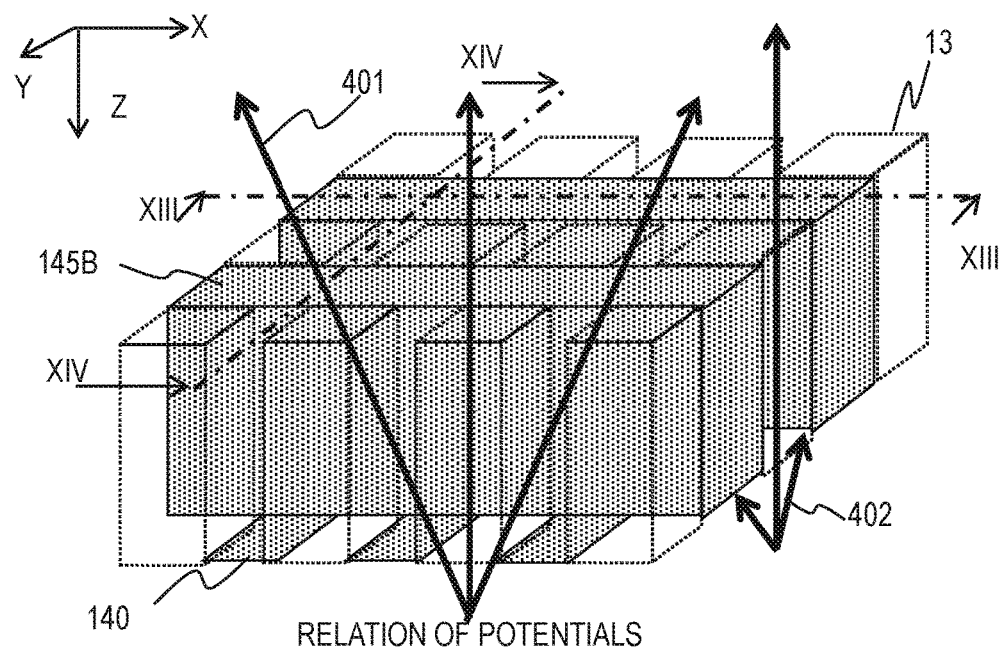
FIG. 12 is a perspective diagram of light absorbers in the 1D vertically narrow viewing angle mode.
Figure 13:
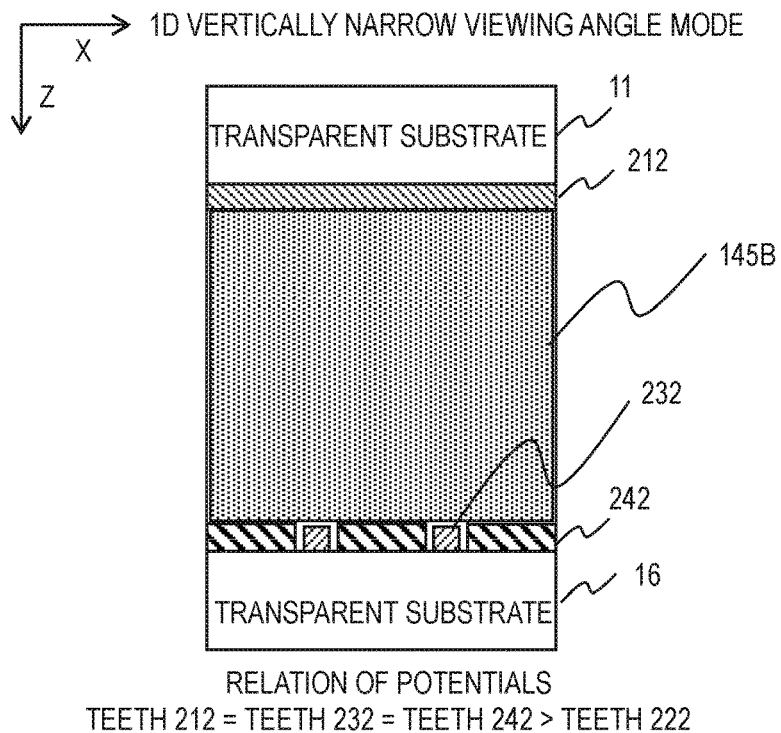
FIG. 13 is a cross-sectional diagram of the light distribution control panel cut along the line XIII-XIII in FIG. 12.
Figure 14:
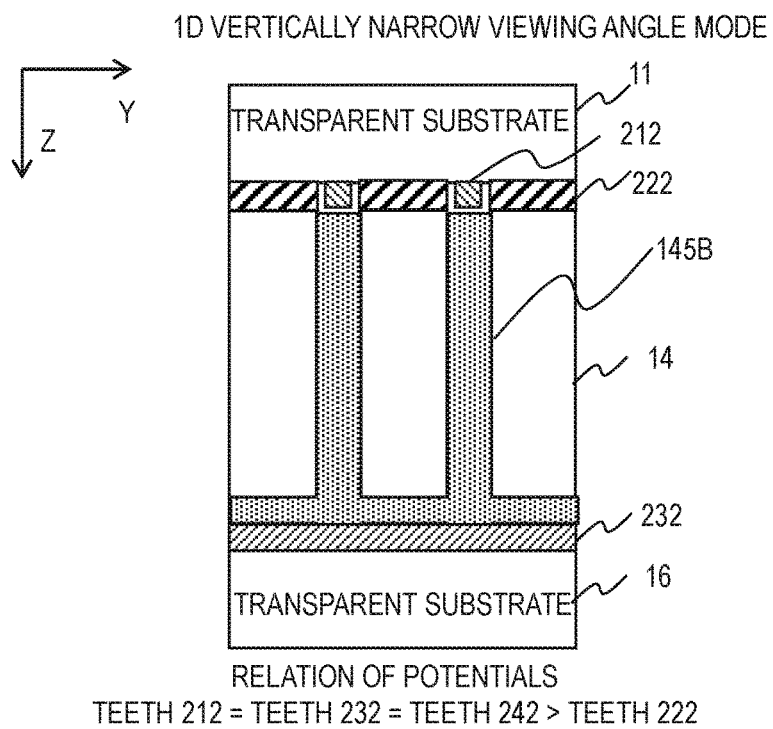
FIG. 14 is a cross-sectional diagram of the light distribution control panel cut along the line XIV-XIV in FIG. 12.

Next, the 1D vertically narrow viewing angle mode is described. FIG. 11 is a plan diagram of the light absorbers 145B in the 1D vertically narrow viewing angle mode. FIG. 12 is a perspective diagram of the light absorbers 145B in the 1D vertically narrow viewing angle mode. FIG. 13 is a cross-sectional diagram of the light distribution control panel 10 cut along the line XIII-XIII in FIG. 12. FIG. 14 is a cross-sectional diagram of the light distribution control panel 10 cut along the line XIV-XIV in FIG. 12.

An example of the relation among the electrode potentials in the 1D vertically narrow viewing angle mode is as follows. The potentials of the first upper comb electrode 201, the first lower comb electrode 203, and the second lower comb electrode 204 are the same. The potentials of these electrodes are higher than the potential of the second upper comb electrode 202. In other words, the potentials of the teeth 212, 232, and 242 are the same and they are higher than the potentials of the teeth 222.

The light absorbers 145B extend along the X-axis and are distant from one another along the Y-axis in the 1D vertically narrow viewing angle mode. The light 402 expanding in the vertical directions (the directions along the Y-axis) is absorbed by the light absorbers 145B to attain a narrow viewing angle state in the vertical directions. However, the light 401 expanding in the horizontal directions (the directions along the X-axis) passes through the light distribution control panel 10 without being absorbed by the light absorbers 145B to attain a wide viewing angle state in the horizontal directions.

As illustrated in FIGS. 13 and 14, the light absorbers 145B are generated between the teeth 212 of the first upper comb electrode 201 and the teeth 232 of the first lower comb electrode 203 and between the teeth 212 of the first upper comb electrode 201 and the teeth 242 of the second lower comb electrode 204. Since the potentials of the teeth 212, 232, and 242 are equal, the electrophoretic particles 140 disperse between the teeth 212 and 232 and between the teeth 212 and 242.

However, the potentials of the teeth 222 of the second upper comb electrode 202 are lower than the potentials of the teeth 232 of the first lower comb electrode 203. Accordingly, as illustrated in FIG. 14, the electrophoretic particles 140 between the teeth 222 and 232 gather around the teeth 232; the transmitted light control region 14 (the electrophoretic particles 140) there are in a light transmissive state. The spaces sandwiched by the teeth 222 of the second upper comb electrode 202 and the teeth 242 of the second lower comb electrode 204 are filled with light transmissive regions 13; there are no electrophoretic particles 140.

The potential of the second upper comb electrode 202 (the teeth 222) can be higher than the potentials of the other electrodes 201, 203, and 204 (the other teeth 212, 232, and 242). In that case, the electrophoretic particles 140 gather around the second upper comb electrode 202 (the teeth 222).

Figure 15:
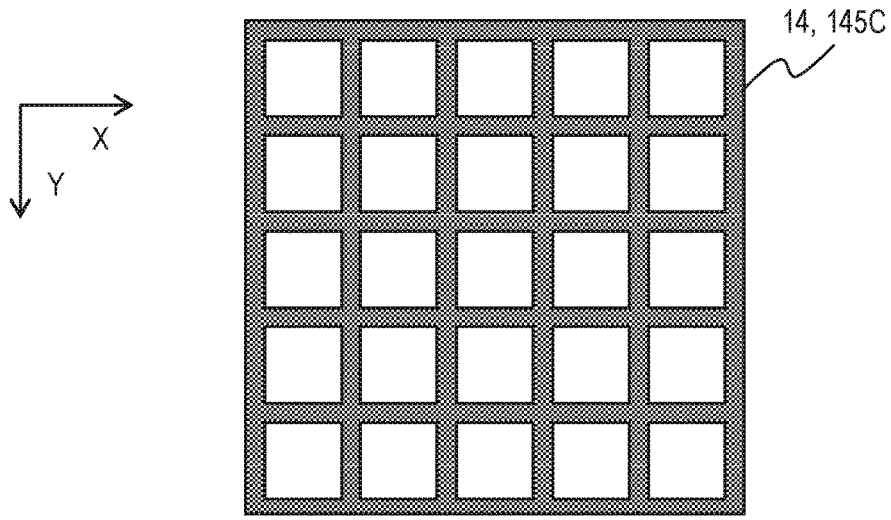
FIG. 15 is a plan diagram of a light absorber in a 2D narrow viewing angle mode.
Figure 16:
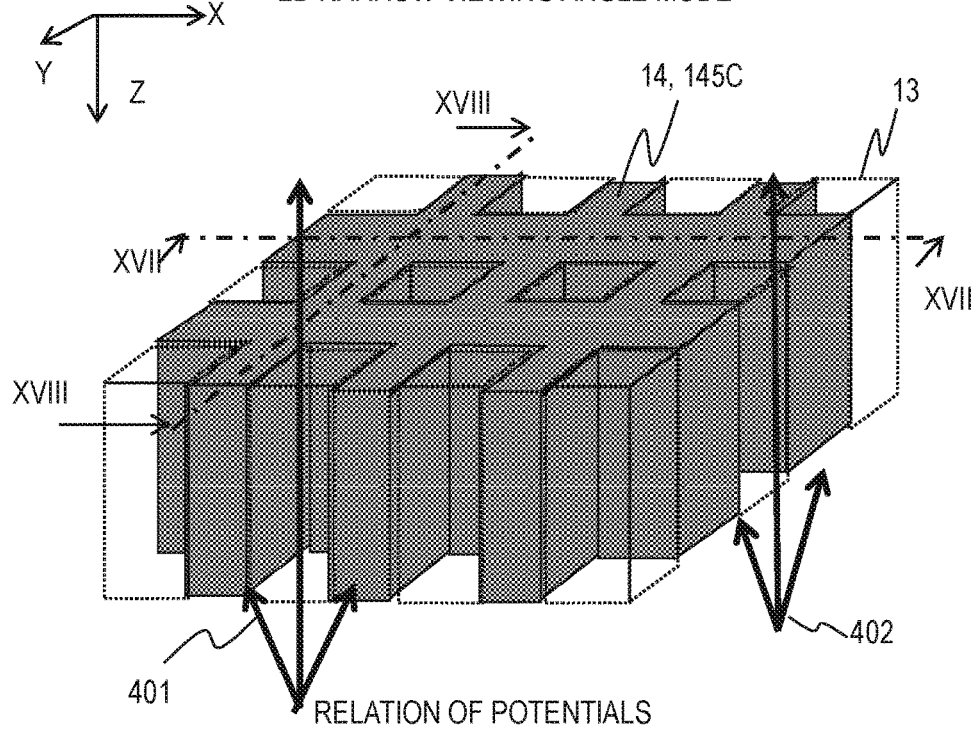
FIG. 16 is a perspective diagram of a light absorber in the 2D narrow viewing angle mode.
Figure 17:
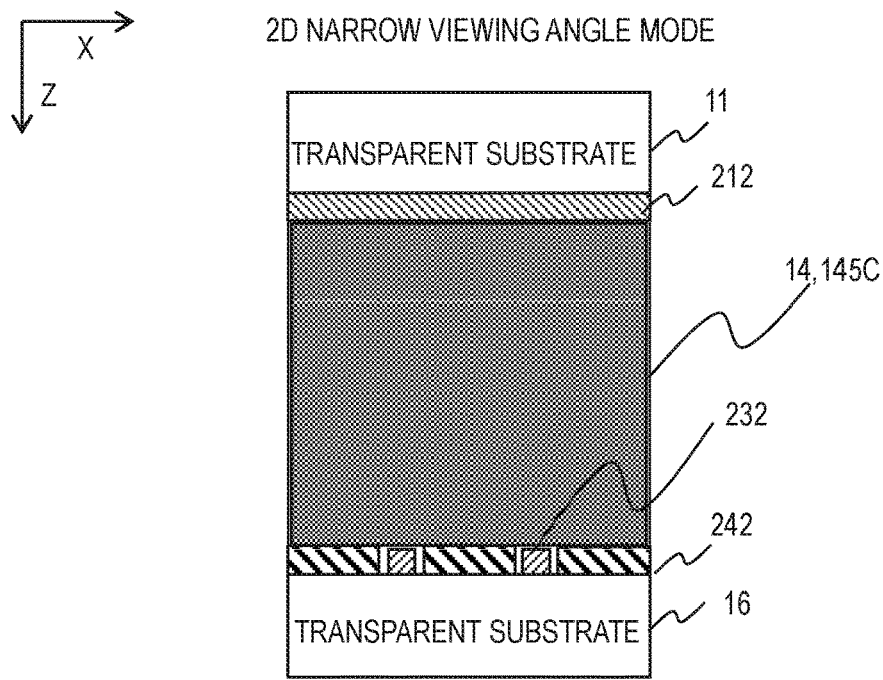
FIG. 17 is a cross-sectional diagram of the light distribution control panel cut along the line XVII-XVII in FIG. 16.
Figure 18:
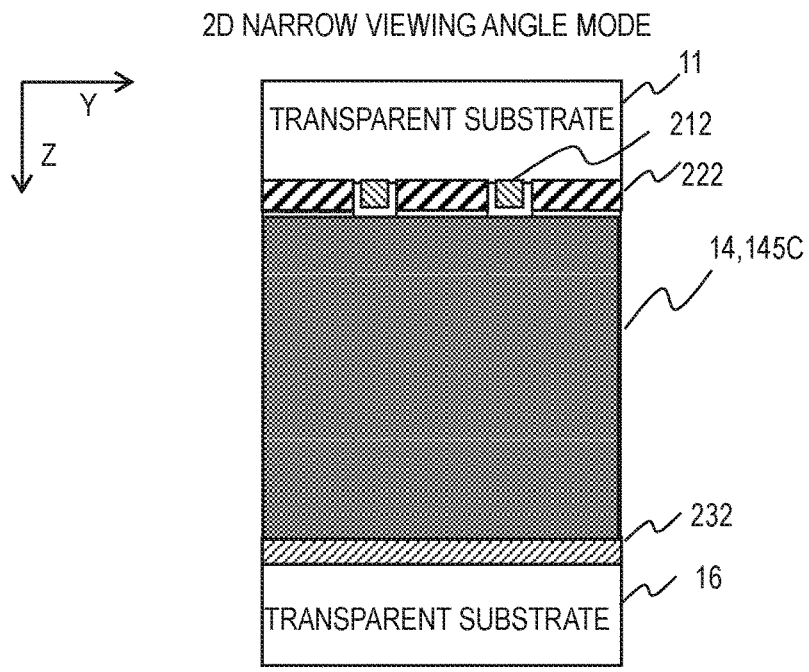
FIG. 18 is a cross-sectional diagram of the light distribution control panel cut along the line XVIII-XVIII in FIG. 16.

Next, the 2D narrow viewing angle mode is described. FIG. 15 is a plan diagram of the light absorber 145C in the 2D narrow viewing angle mode. FIG. 16 is a perspective diagram of the light absorber 145C in the 2D narrow viewing angle mode. FIG. 17 is a cross-sectional diagram of the light distribution control panel 10 cut along the line XVII-XVII in FIG. 16. FIG. 18 is a cross-sectional diagram of the light distribution control panel 10 cut along the line XVIII-XVIII in FIG. 16.

The relation among the electrode potentials in the 2D narrow viewing angle mode is as follows. The potentials of the first upper comb electrode 201, the second upper comb electrode 202, the first lower comb electrode 203, and the second lower comb electrode 204 are the same. In other words, the potentials of the teeth 212, 222, 232, and 242 are the same.

The light absorber 145C has a shape of a grid including parts extending along the X-axis and being distant from one another along the Y-axis and parts extending along the Y-axis and being distant from one another along the X-axis. The light 402 expanding in the vertical directions (the directions along the Y-axis) is absorbed by the light absorber 145C to attain a narrow viewing angle state in the vertical directions. Further, the light 401 expanding in the horizontal directions (the directions along the X-axis) is absorbed by the light absorber 145C to attain a narrow viewing angle state in the horizontal directions.

As illustrated in FIGS. 17 and 18, the light absorber 145C is generated between the teeth 212 of the first upper comb electrode 201 and the teeth 232 of the first lower comb electrode 203 and between the teeth 212 of the first upper comb electrode 201 and the teeth 242 of the second lower comb electrode 204. Furthermore, the light absorber 145C is generated between the teeth 232 of the first lower comb electrode 203 and the teeth 222 of the second upper comb electrode 202.

Since the potentials of the teeth 212, 222, 232, and 242 are equal, the electrophoretic particles 140 disperse between the teeth 212 and 232, between the teeth 212 and 242, and between the teeth 232 and 222. The spaces sandwiched by the teeth 222 of the second upper comb electrode 202 and the teeth 242 of the second lower comb electrode 204 are filled with light transmissive regions 13; there are no electrophoretic particles 140.

Figure 19:
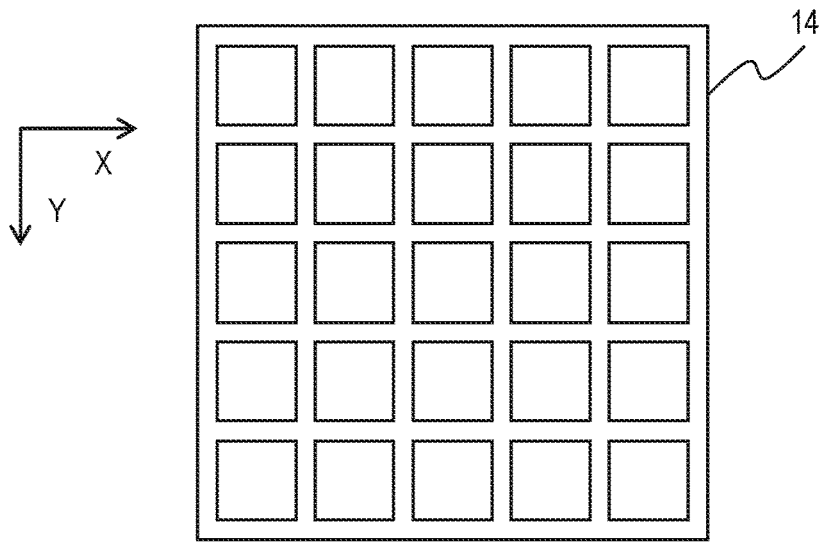
FIG. 19 is a plan diagram of a transmitted light control region in a wide viewing angle mode.
Figure 20:
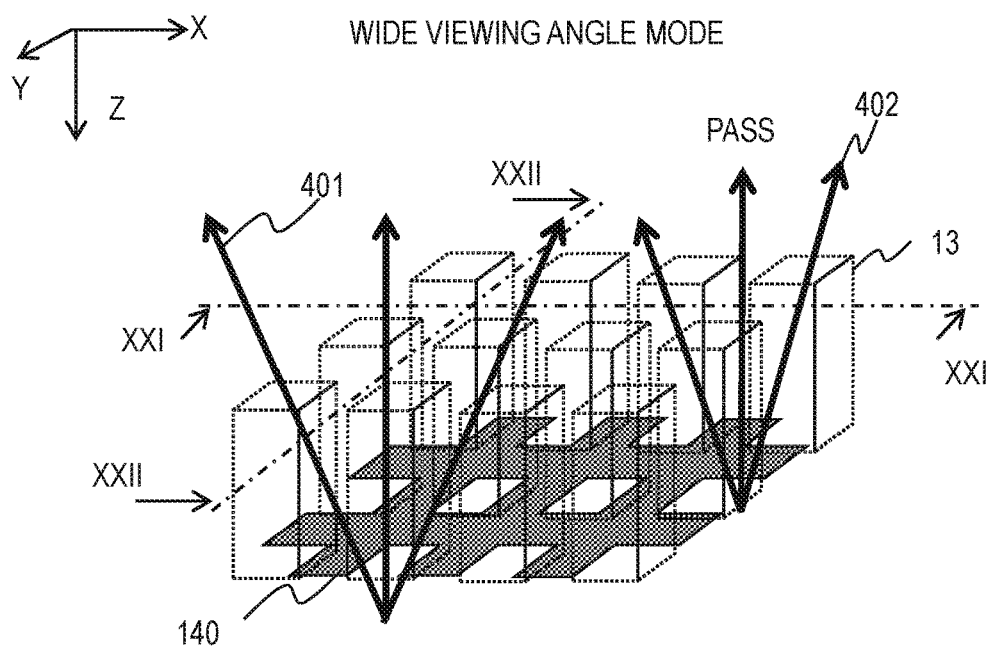
FIG. 20 is a perspective diagram of the transmitted light control region in the wide viewing angle mode.
Figure 21:
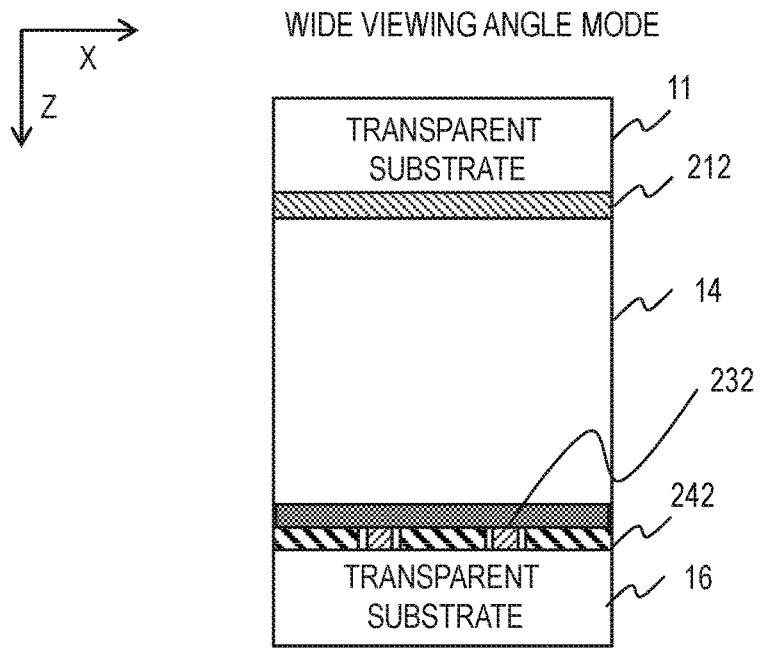
FIG. 21 is a cross-sectional diagram of the light distribution control panel cut along the line XXI-XXI in FIG. 20.
Figure 22:
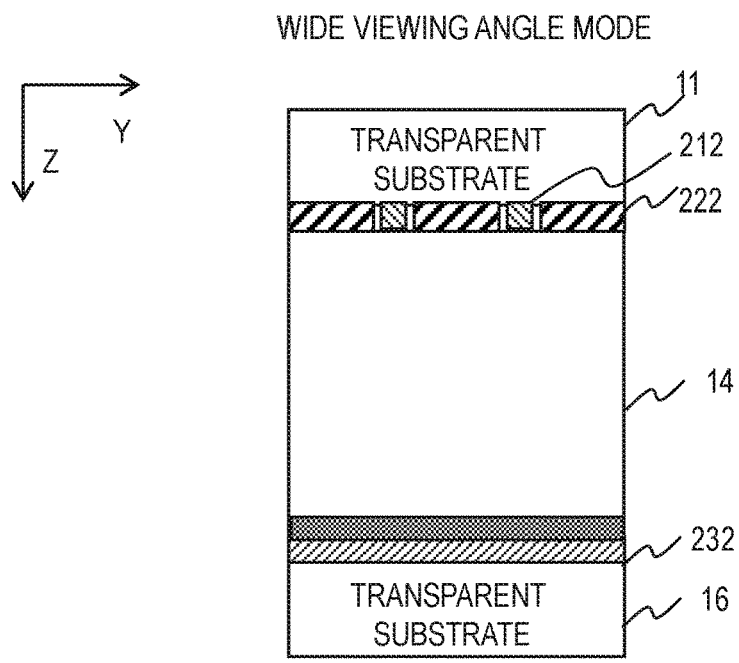
FIG. 22 is a cross-sectional diagram of the light distribution control panel cut along the line XXII-XXII in FIG. 20.

Next, the wide viewing angle mode is described. FIG. 19 is a plan diagram of the transmitted light control region 14 in the wide viewing angle mode. FIG. 20 is a perspective diagram of the transmitted light control region 14 in the wide viewing angle mode. FIG. 21 is a cross-sectional diagram of the light distribution control panel 10 cut along the line XXI-XXI in FIG. 20. FIG. 22 is a cross-sectional diagram of the light distribution control panel 10 cut along the line XXII-XXII in FIG. 20.

The relation among the electrode potentials in the wide viewing angle mode is as follows. The potentials of the first upper comb electrode 201 and the second upper comb electrode 202 are the same and the potentials of the first lower comb electrode 203 and the second lower comb electrode 204 are the same. The potentials of the first lower comb electrode 203 and the second lower comb electrode 204 are higher than the potentials of the first upper comb electrode 201 and the second upper comb electrode 202. In other words, the potentials of the teeth 212 and 222 are the same and the potentials of the teeth 232 and 242 are the same. The potentials of the teeth 232 and 242 are higher than the potentials of the teeth 212 and 222.

The entire transmitted light control region 14 are in a light transmissive state. The light 402 expanding in the vertical directions (the directions along the Y-axis) and the light 401 expanding in the horizontal directions (the directions along the X-axis) pass through the light distribution control panel 10 to attain a wide viewing angle state in the vertical directions and horizontal directions.

The potentials of the teeth 212 of the first upper comb electrode 201 is lower than the potentials of the teeth 232 of the first lower comb electrode 203 and the teeth 242 of the second lower comb electrode 204. Accordingly, the electrophoretic particles 140 between the teeth 212 and the rows of the teeth 232 and 242 gather around the teeth 232 and 242 as illustrated in FIG. 21. The potentials of the teeth 232 of the first lower comb electrode 203 is higher than the potentials of the teeth 212 of the first upper comb electrode 201 and the teeth 222 of the second upper comb electrode 202. Accordingly, the electrophoretic particles 140 between the teeth 232 and the columns of the teeth 212 and 222 gather around the teeth 232 as illustrated in FIG. 22.

As understood from the above description, the electrophoretic particles 140 gather around the lower comb electrodes 203 and 204 (the lower teeth 232 and 242), so that the entire transmitted light control region 14 becomes a light transmissive state. The potentials of the first lower comb electrode 203 and the second lower comb electrode 204 can be lower than the potentials of the first upper comb electrode 201 and the second upper comb electrode 202. In other words, the potentials of the teeth 232 and 242 can be lower than the potentials of the teeth 212 and 222. In that case, the electrophoretic particles 140 gather around the upper comb electrodes 201 and 202 (the upper teeth 212 and 222).

As described above, the viewing angle mode of the light distribution control panel 10 can be changed among four modes by controlling the potentials of the electrodes 201 to 204.

Other Configuration Examples of Light Distribution Control Panel

Figure 23:
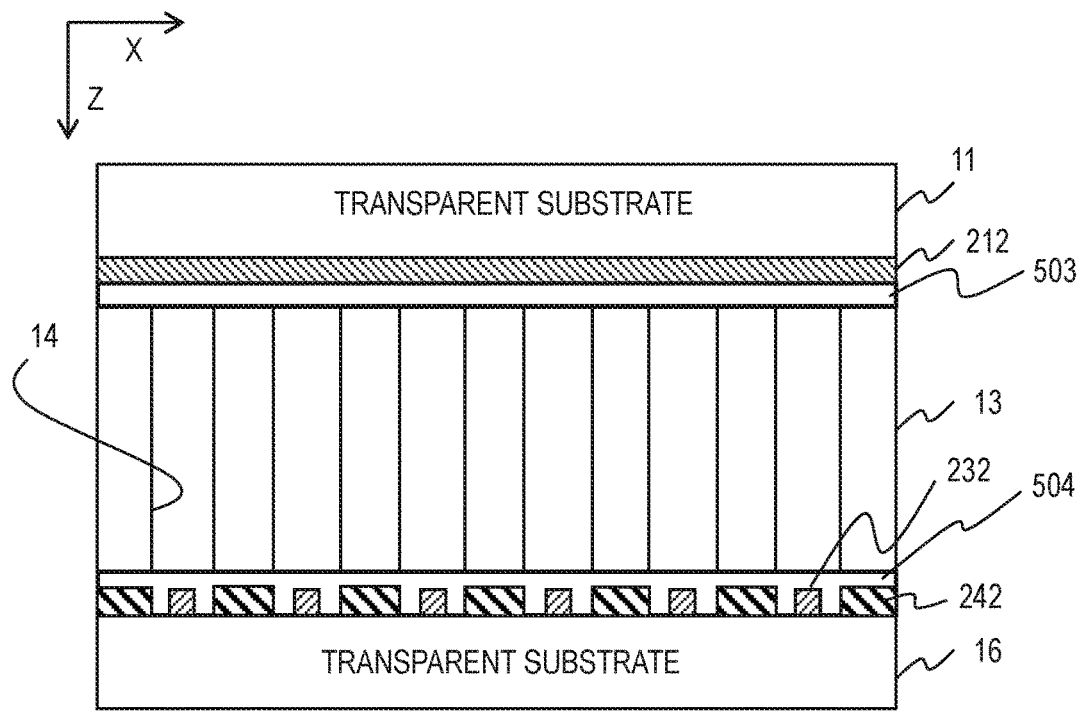
FIG. 23 is a cross-sectional diagram of another configuration example of a light distribution control panel.
Figure 24:
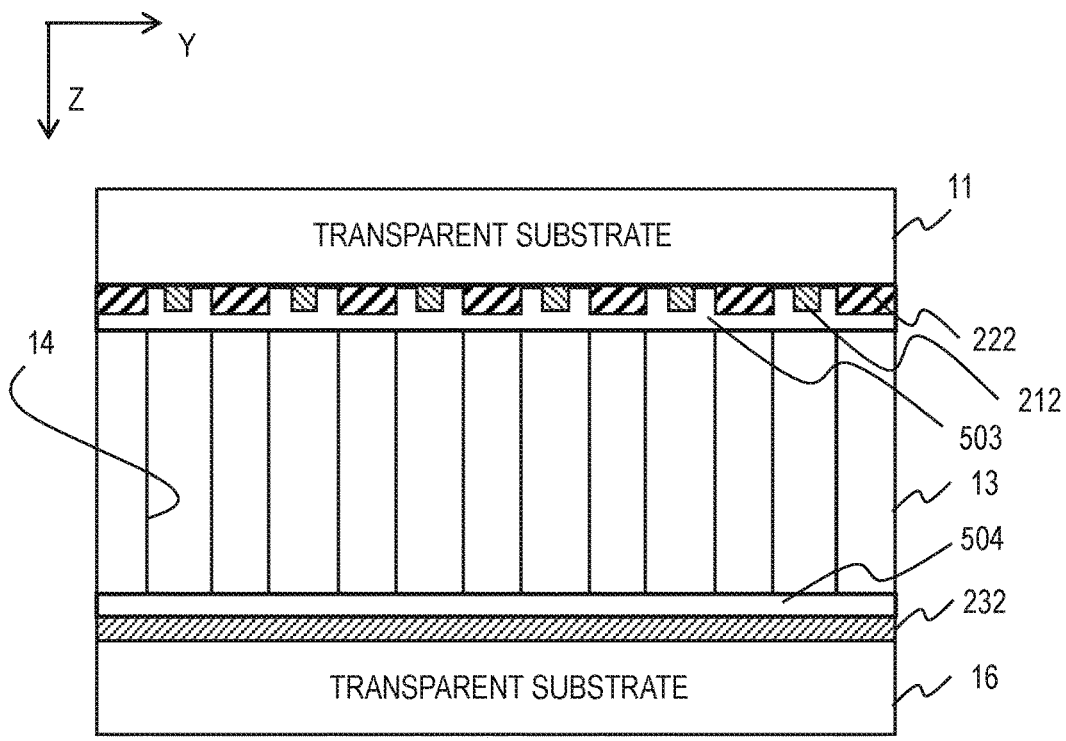
FIG. 24 is another cross-sectional diagram of the other configuration example of a light distribution control panel.

Next, another configuration example of the light distribution control panel 10 is described. The plan diagram of the first upper comb electrode 201, the second upper comb electrode 202, the first lower comb electrode 203, and the second lower comb electrode 204 of this configuration example is the same as FIG. 4A. FIGS. 23 and 24 are cross-sectional diagrams of this configuration example. The positions of the cross-sections in FIGS. 23 and 24 are the same as the positions of the cross-sections in FIGS. 5 and 6 (the line V-V and the line VI-VI in FIG. 4A), respectively.

Differences from the configuration illustrated in FIGS. 5 and 6 are mainly described in the following. The light distribution control panel 10 in FIG. 23 includes insulating layers 503 and 504. The insulating layer 503 is provided to cover the first upper comb electrode 201 (the teeth 212) and the second upper comb electrode 202 (the teeth 222). The insulating layer 504 is provided to cover the first lower comb electrode 203 (the teeth 232) and the second lower comb electrode 204 (the teeth 242).

The light distribution control panel 10 in this example includes insulating layers covering the first upper comb electrode 201, the second upper comb electrode 202, the first lower comb electrode 203, and the second lower comb electrode 204. This configuration eliminates contact of the electrophoretic particles 140 to the electrodes, attaining higher operating stability in the light distribution control panel 10.

Figure 25:
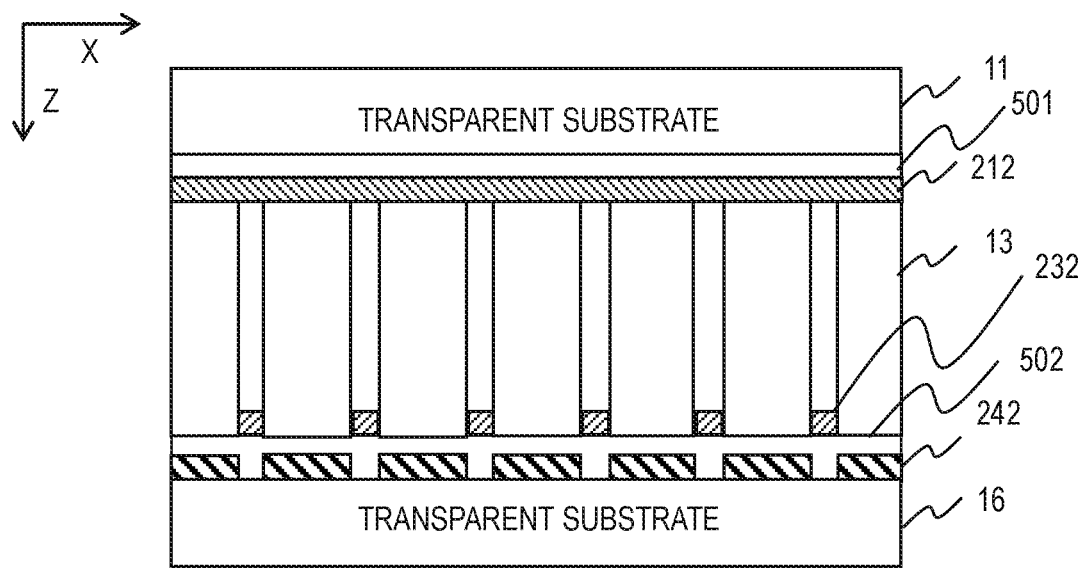
FIG. 25 is a cross-sectional diagram of still another configuration example of a light distribution control panel.
Figure 26:
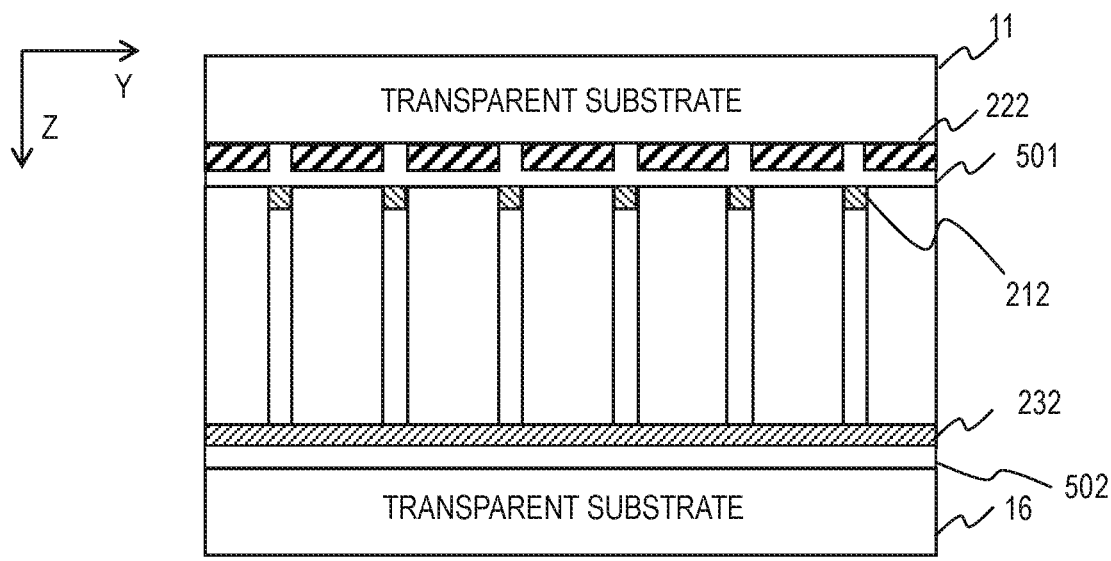
FIG. 26 is another cross-sectional diagram of the still other configuration example of a light distribution control panel.

Still another configuration example of the light distribution control panel 10 is described. The plan diagram of the first upper comb electrode 201, the second upper comb electrode 202, the first lower comb electrode 203, and the second lower comb electrode 204 in this configuration example is the same as FIG. 4A. FIGS. 25 and 26 are cross-sectional diagrams of this configuration example. The positions of the cross-sections in FIGS. 25 and 26 are the same as the positions of the cross-sections in FIGS. 5 and 6 (the line V-V and the line VI-VI in FIG. 4A), respectively. Differences from the configuration illustrated in FIGS. 5 and 6 are mainly described in the following.

As illustrated in FIG. 25, the insulating layer 501 is provided between the first upper comb electrode 201 (the teeth 212) and the transparent substrate 11. The first lower comb electrode 203 (the teeth 232) and the second lower comb electrode 204 (the teeth 242) are disposed on different layers and the insulating layer 502 is provided therebetween. In this configuration example, the first lower comb electrode 203 is disposed on a layer upper than the second lower comb electrode 204. The insulating layers 501 and 502 can be made of organic or inorganic insulating material.

As illustrated in FIG. 26, an insulating layer 502 is provided between the first lower comb electrode 203 (the teeth 232) and the transparent substrate 16. Further, the first upper comb electrode 201 (the teeth 212) and the second upper comb electrode 202 (the teeth 222) are disposed on different layers and an insulating layer 501 is provided therebetween. In this configuration example, the first upper comb electrode 201 is disposed on a layer lower than the second upper comb electrode 202.

The above-described configuration where the first upper comb electrode 201 (the teeth 212) and the second upper comb electrode 202 (the teeth 222) are disposed on different layers and the first lower comb electrode 203 (the teeth 232) and the second lower comb electrode 204 (the teeth 242) are disposed on different layers reduces the possibility of a short circuit between the upper comb electrodes or between the lower comb electrodes.

Figure 27:
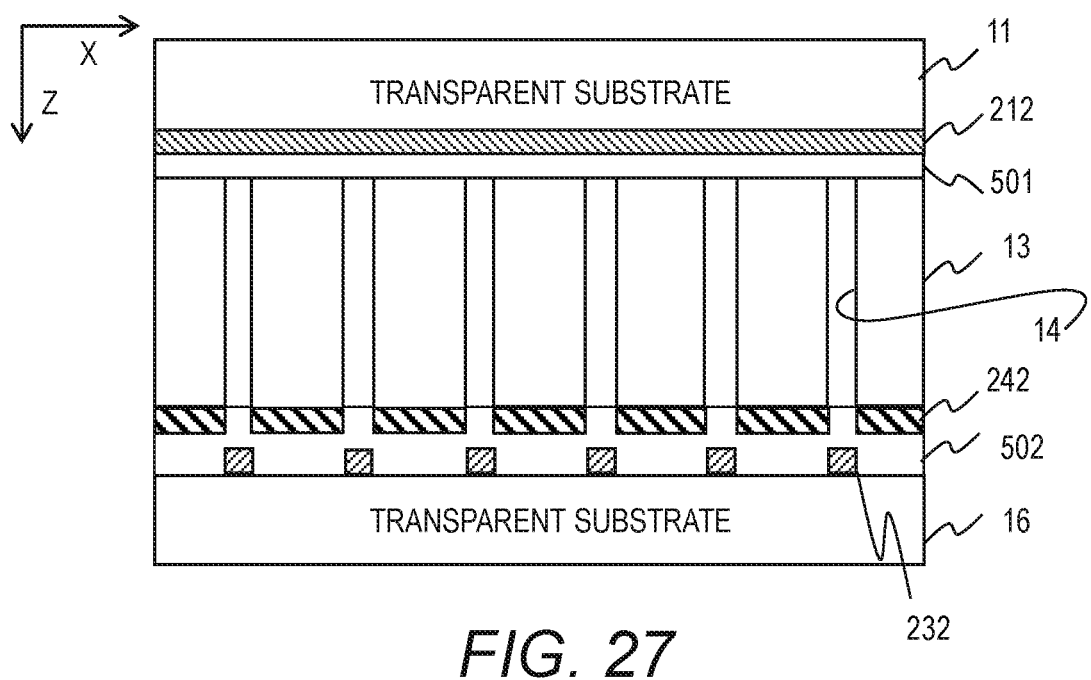
FIG. 27 is a cross-sectional diagram of still another configuration example of a light distribution control panel.
Figure 28:
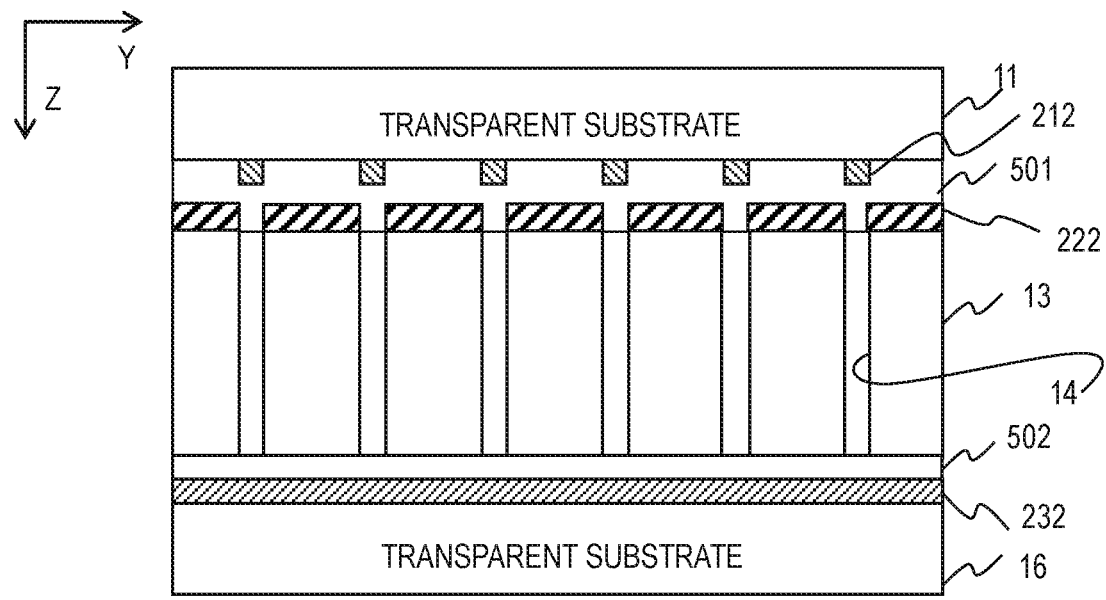
FIG. 28 is another cross-sectional diagram of the still other configuration example of a light distribution control panel.

Still another configuration example of the light distribution control panel 10 is described. FIGS. 27 and 28 are cross-sectional diagrams of this configuration example. The positions of the cross-sections in FIGS. 27 and 28 are the same as the positions of the cross-sections in FIGS. 25 and 26, respectively. Differences from the configuration illustrated in FIGS. 25 and 26 are mainly described in the following.

As illustrated in FIG. 27, an insulating layer 501 is provided between the first upper comb electrode 201 (the teeth 212) and the layer of the light transmissive regions 13 and the transmitted light control region 14. The first lower comb electrode 203 (the teeth 232) and the second lower comb electrode 204 (the teeth 242) are disposed on different layers and an insulating layer 502 is provided therebetween. In this configuration example, the first lower comb electrode 203 is disposed on a layer lower than the second lower comb electrode 204.

As illustrated in FIG. 28, the insulating layer 502 is provided between the first lower comb electrode 203 (the teeth 232) and the layer of the light transmissive regions 13 and the transmitted light control region 14. The first upper comb electrode 201 (the teeth 212) and the second upper comb electrode 202 (the teeth 222) are disposed on different layers and the insulating layer 501 is provided therebetween. In this configuration example, the first upper comb electrode 201 is disposed on a layer upper than the second upper comb electrode 202.

The above-described configuration where the first upper comb electrode 201 (the teeth 212) and the second upper comb electrode 202 (the teeth 222) are disposed on different layers and the first lower comb electrode 203 (the teeth 232) and the second lower comb electrode 204 (the teeth 242) are disposed on different layers reduces the possibility of a short circuit between the upper comb electrodes or between the lower comb electrodes. Only either the upper comb electrodes 201 and 202 or the lower comb electrodes 203 and 204 can be disposed on different layers.

Figure 29:
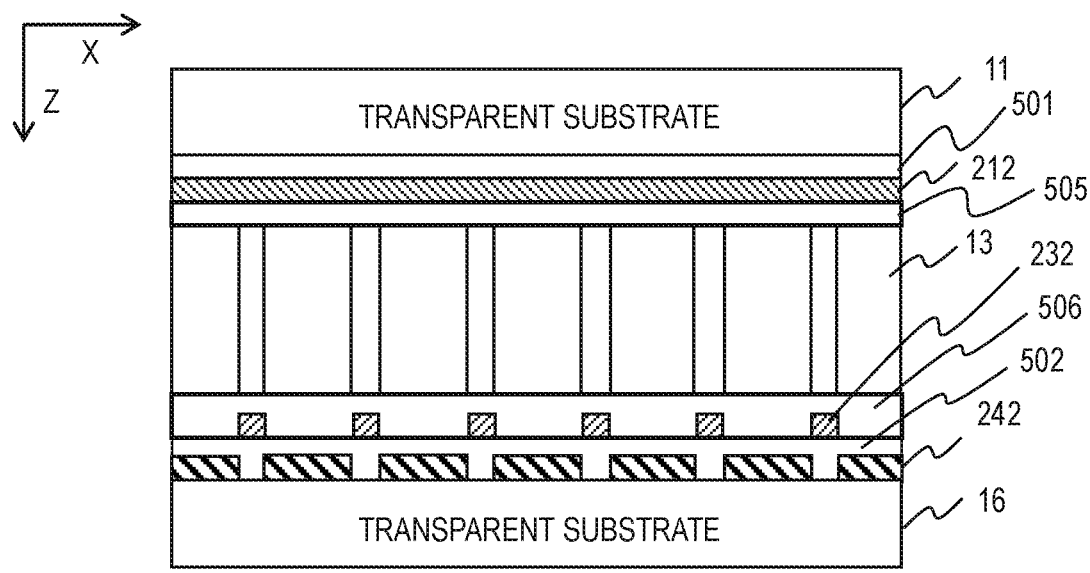
FIG. 29 is a cross-sectional diagram of still another configuration example of a light distribution control panel.
Figure 30:
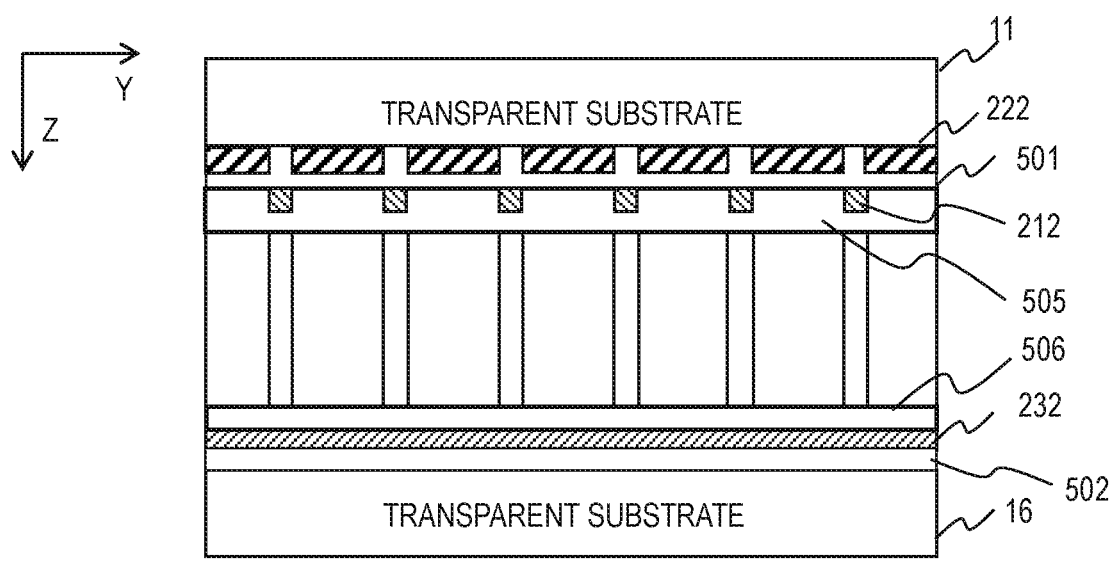
FIG. 30 is another cross-sectional diagram of the still other configuration example of a light distribution control panel.

Still another configuration example of the light distribution control panel 10 is described. The plan diagram of the first upper comb electrode 201, the second upper comb electrode 202, the first lower comb electrode 203, and the second lower comb electrode 204 in this configuration example is the same as FIG. 4A. FIGS. 29 and 30 are cross-sectional diagrams of this configuration example. The positions of the cross-sections in FIGS. 29 and 30 are the same as the positions of the cross-sections in FIGS. 25 and 26 (the line V-V and the line VI-VI in FIG. 4A), respectively. Differences from the configuration illustrated in FIGS. 25 and 26 are mainly described in the following.

The light distribution control panel 10 in FIGS. 29 and 30 includes insulating layers 505 and 506. The insulating layer 505 is provided to cover the first upper comb electrode 201 (the teeth 212). The insulating layer 506 is provided to cover the first lower comb electrode 203 (the teeth 232). The light distribution control panel 10 in this example includes insulating layers covering the first upper comb electrode 201 and the first lower comb electrode 203. This configuration eliminates contact of the electrophoretic particles 140 to the first upper comb electrode 201 and the first lower comb electrode 203, attaining higher operating stability in the light distribution control panel 10.

Figure 31:
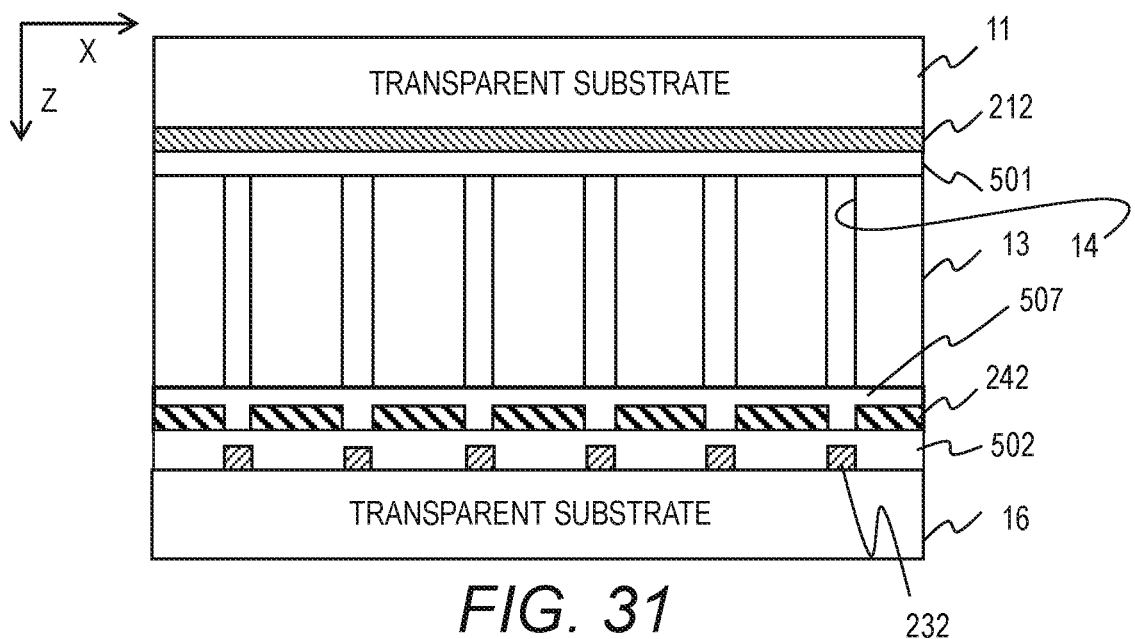
FIG. 31 is a cross-sectional diagram of still another configuration example of a light distribution control panel.
Figure 32:
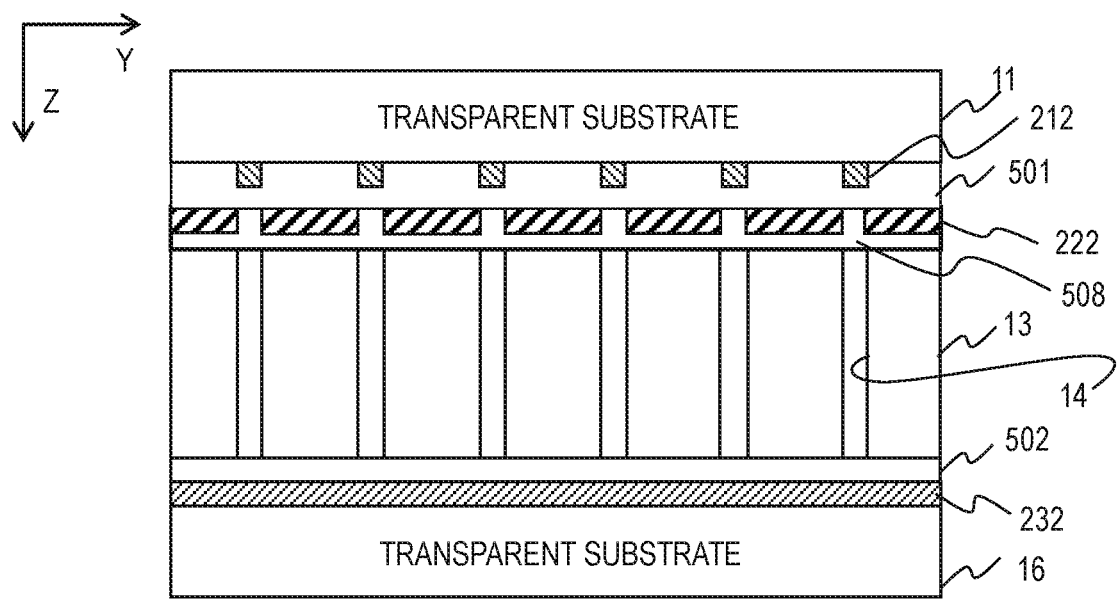
FIG. 32 is another cross-sectional diagram of the still other configuration example of a light distribution control panel.

Still another configuration example of the light distribution control panel 10 is described. The plan diagram of the first upper comb electrode 201, the second upper comb electrode 202, the first lower comb electrode 203, and the second lower comb electrode 204 in this configuration example is the same as FIG. 4A. FIGS. 31 and 32 are cross-sectional diagrams of this configuration example. The positions of the cross-sections in FIGS. 31 and 32 are the same as the positions of the cross-sections in FIGS. 27 and 28 (the line V-V and the line VI-VI in FIG. 4A), respectively.

Differences from the configuration illustrated in FIGS. 27 and 28 are mainly described in the following. The light distribution control panel 10 in FIGS. 31 and 32 includes insulating layers 507 and 508. The insulating layer 507 is provided to cover the second lower comb electrode 204 (the teeth 242). The insulating layer 508 is provided to cover the second upper comb electrode 202 (the teeth 222).

The light distribution control panel 10 in this embodiment includes insulating layers covering the second lower comb electrode 204 and the second upper comb electrode 202. This configuration eliminates contact of the electrophoretic particles 140 to the second upper comb electrode 202 and the second lower comb electrode 204, attaining higher operating stability in the light distribution control panel 10.

Figure 33:
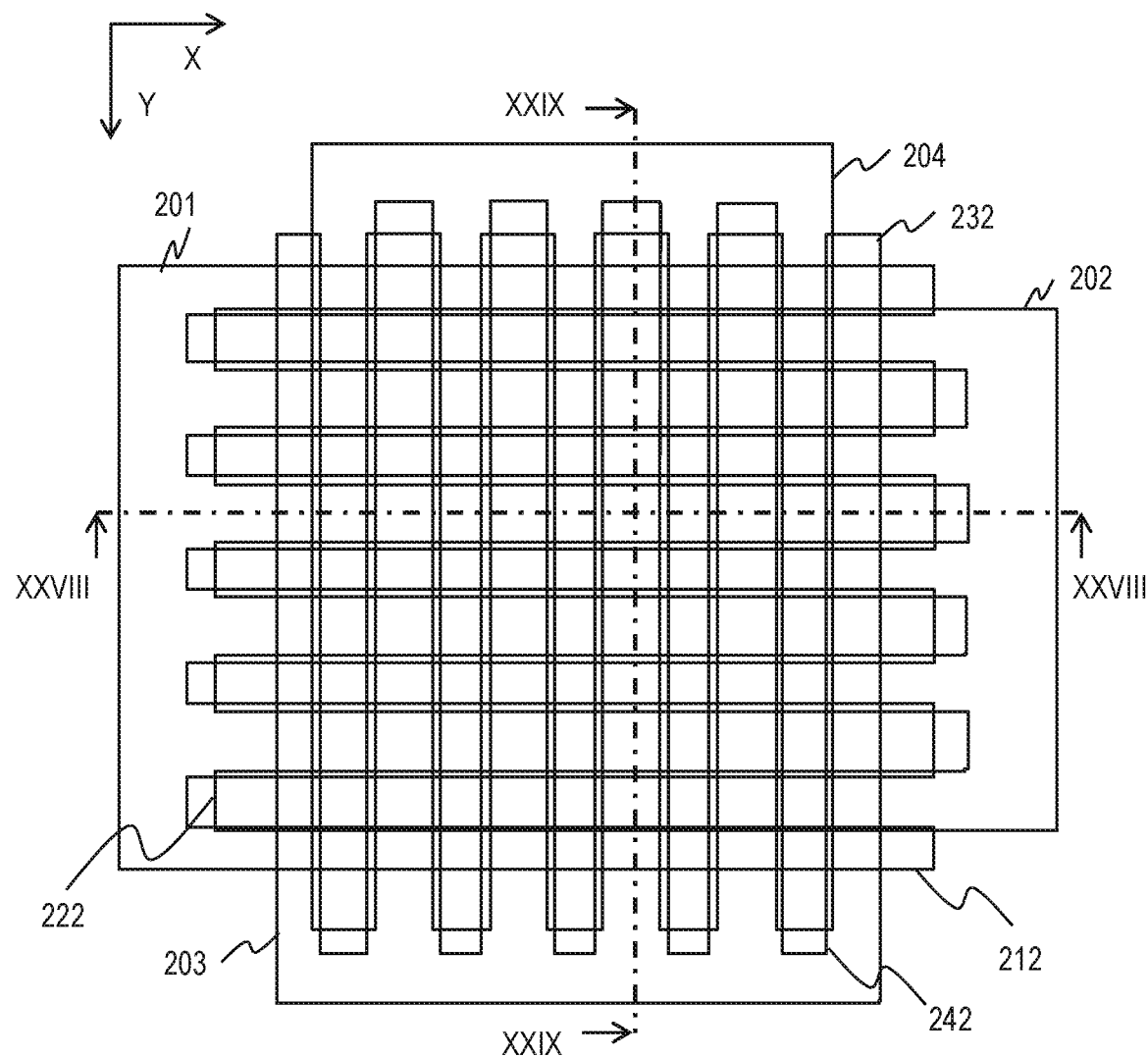
FIG. 33 is a plan diagram schematically illustrating a first upper comb electrode, a second upper comb electrode, a first lower comb electrode, and a second lower comb electrode in still another configuration example of a light distribution control panel.
Figure 34:
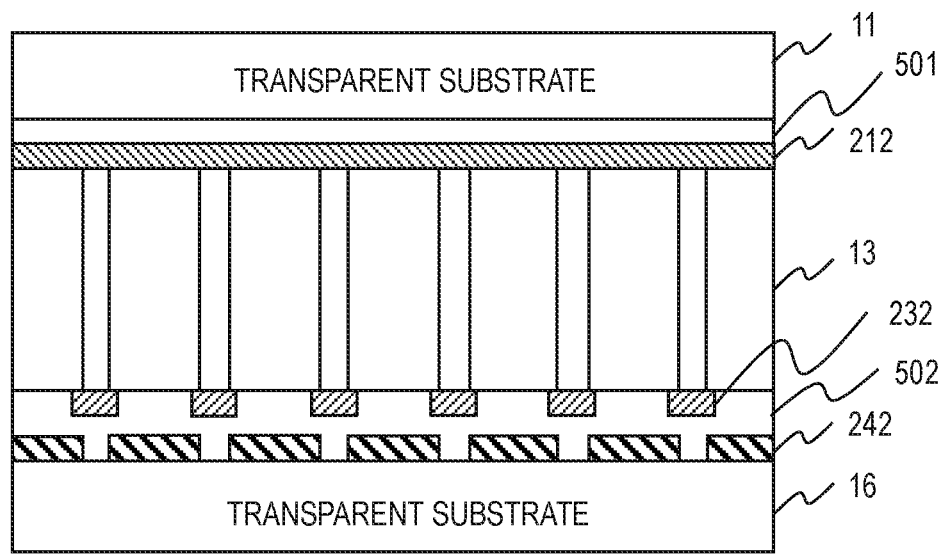
FIG. 34 is a cross-sectional diagram of the light distribution control panel cut along the line XXVIII-XXVIII in FIG. 33.
Figure 35:
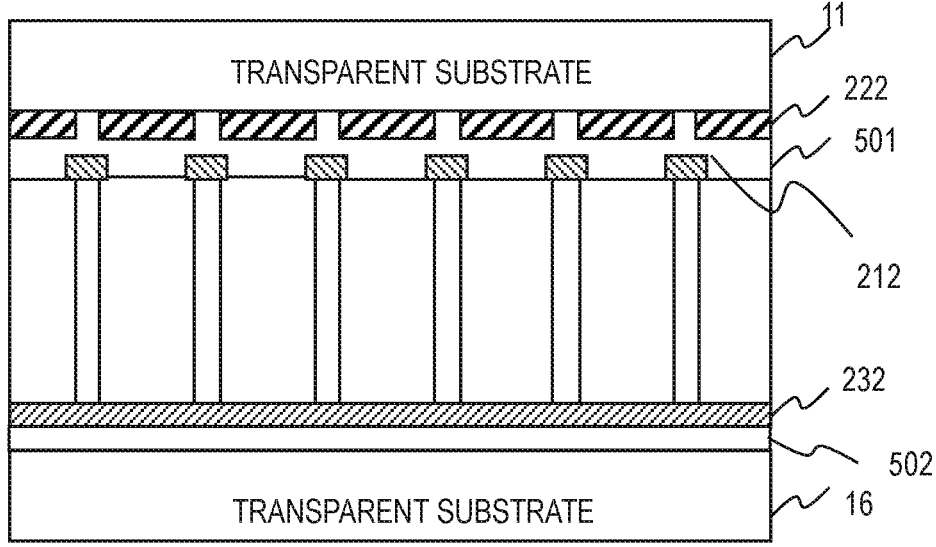
FIG. 35 is a cross-sectional diagram of the light distribution control panel cut along the line XXIX-XXIX in FIG. 33.

Still another configuration example of the light distribution control panel 10 is described. FIG. 33 is a plan diagram schematically illustrating the first upper comb electrode 201, the second upper comb electrode 202, the first lower comb electrode 203, and the second lower comb electrode 204. FIG. 34 is a cross-sectional diagram of the light distribution control panel 10 cut along the line XXVIII-XXVIII in FIG. 33. FIG. 35 is a cross-sectional diagram of the light distribution control panel 10 cut along the line XXIX-XXIX in FIG. 33.

Differences from the configuration illustrated in FIG. 4A and the configuration illustrated in FIGS. 25 and 26 are mainly described in the following. In this configuration example, the first upper comb electrode 201 and the second upper comb electrode 202 are disposed on different layers and further, the first lower comb electrode 203 and the second lower comb electrode 204 are disposed on different layers, like the configuration described with reference to FIGS. 25 and 26.

As illustrated in FIGS. 33 and 35, a tooth 212 of the first upper comb electrode 201 and a tooth 222 of the second upper comb electrode 202 adjacent to each other overlap each other, when viewed planarly. Each end of the tooth 212 is located in a light transmissive region 13, when viewed planarly; each end of the tooth 222 is located in the transmitted light control region 14, when viewed planarly. As illustrated in FIGS. 33 and 34, a tooth 232 of the first lower comb electrode 203 and a tooth 242 of the second lower comb electrode 204 adjacent to each other overlap each other, when viewed planarly. Each end of the tooth 232 is located in a light transmissive region 13, when viewed planarly; each end of the tooth 242 is located in the transmitted light control region 14, when viewed planarly.

The overlaps between adjacent teeth 212 and 222 reduce the possibility of generation of a gap between the teeth 212 and 222 in an in-plane direction (the direction along the Y-axis) to appropriately apply an electric field to the electrophoretic particles 140. The overlaps between adjacent teeth 232 and 242 reduce the possibility of generation of a gap between the teeth 232 and 242 in an in-plane direction (the direction along the X-axis) to appropriately apply an electric field to the electrophoretic particles 140. The overlaps can be provided only between adjacent teeth 212 and 222 or between adjacent teeth 232 and 242.

Figure 36:
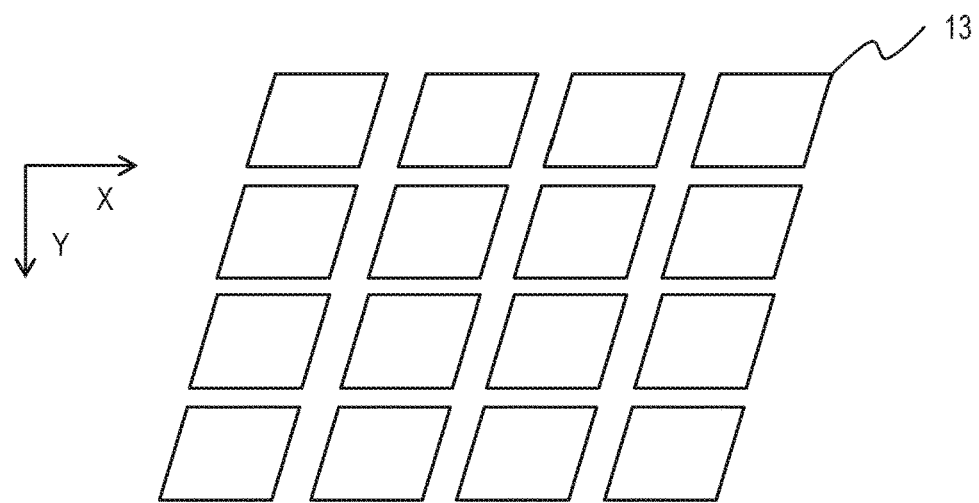
FIG. 36 is a plan diagram schematically illustrating light transmissive regions in still another configuration example of a light distribution control panel.
Figure 37:
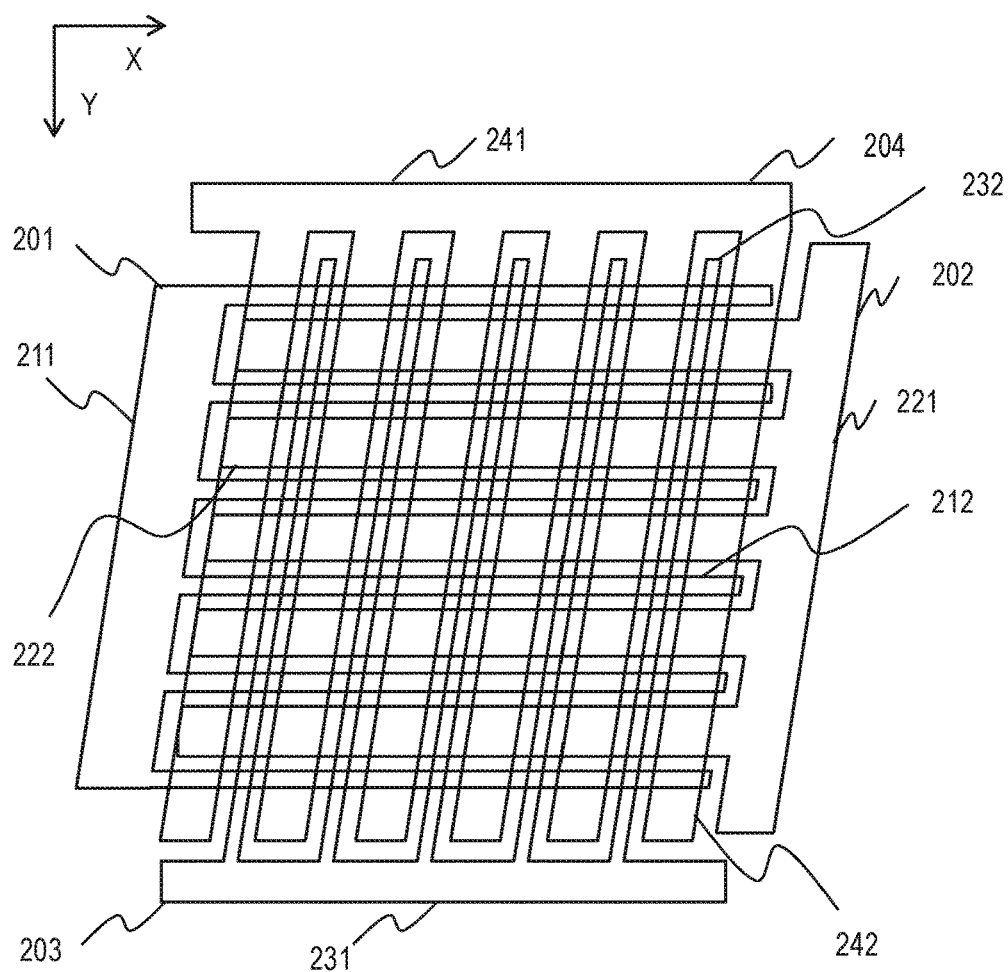
FIG. 37 is a plan diagram schematically illustrating a first upper comb electrode, a second upper comb electrode, a first lower comb electrode, and a second lower comb electrode in the still other configuration example of a light distribution control panel.

Still another configuration example of the light distribution control panel 10 is described. FIG. 36 is a plan diagram schematically illustrating the light transmissive regions 13 in this configuration example. FIG. 37 is a plan diagram schematically illustrating the first upper comb electrode 201, the second upper comb electrode 202, the first lower comb electrode 203, and the second lower comb electrode 204. Differences from the configuration illustrated in FIGS. 3D and 4A are mainly described in the following.

As illustrated in FIG. 36, the shape of each light transmissive region 13 is a parallelogram having interior angles different from right angles, when viewed planarly. The shape has two sides extending along the X-axis and two sides extending obliquely to the Y-axis. Light transmissive regions 13 are disposed along the X-axis and obliquely to the Y-axis. The light transmissive regions 13 in this example are disposed in parallel to the sides of the parallelograms.

As illustrated in FIG. 37, the teeth 212, 222, 232, and 242 of the electrodes are shaped and disposed to meet the shapes and the disposition of the light transmissive regions 13. Specifically, the teeth 212 and 222 of the upper comb electrodes extend along the X-axis. As described above, each teeth 212 extends along the transmitted light control region 14 and each teeth 222 extends along a row of light transmissive regions 13. The connectors 211 and 221 extend obliquely to the Y-axis to meet the shapes and the disposition of the light transmissive regions 13.

The teeth 232 and 242 of the lower comb electrodes extend obliquely to the Y-axis (in the second direction). As described above, each teeth 232 extends along the transmitted light control region 14 and each teeth 242 extends along a column of light transmissive regions 13. The shapes of the parts where the teeth 222 and 242 intersect are parallelograms.

Commonly, the pixels of a display panel have rectangular shapes and they are disposed in a matrix. The light transmissive regions 13 shaped in parallelograms having interior angles different from right angles when viewed planarly achieve reduction in moire generated by interference between a black matrix of the display panel and the light absorbers of the light distribution control panel 10. The teeth 212 and 222 of the upper comb electrodes can extend obliquely to the X-axis and the teeth 232 and 242 of the lower comb electrodes can extend along the Y-axis. Alternatively, the teeth 212 and 222 of the upper comb electrodes can extend obliquely to the X-axis and the teeth 232 and 242 of the lower comb electrodes can extend obliquely to the Y-axis.

Control of Viewing Angle Mode

Figure 38A:
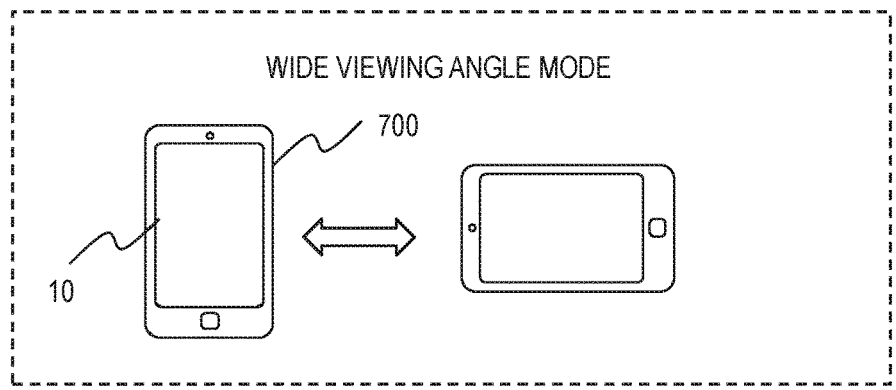
FIG. 38A schematically illustrates a function of a mobile terminal including a display panel and a light distribution control panel.
Figure 38B:
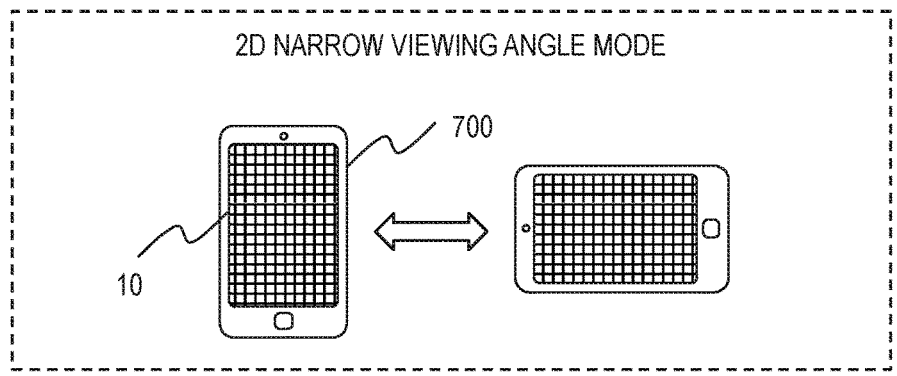
FIG. 38B schematically illustrates another function of the mobile terminal.
Figure 38C:
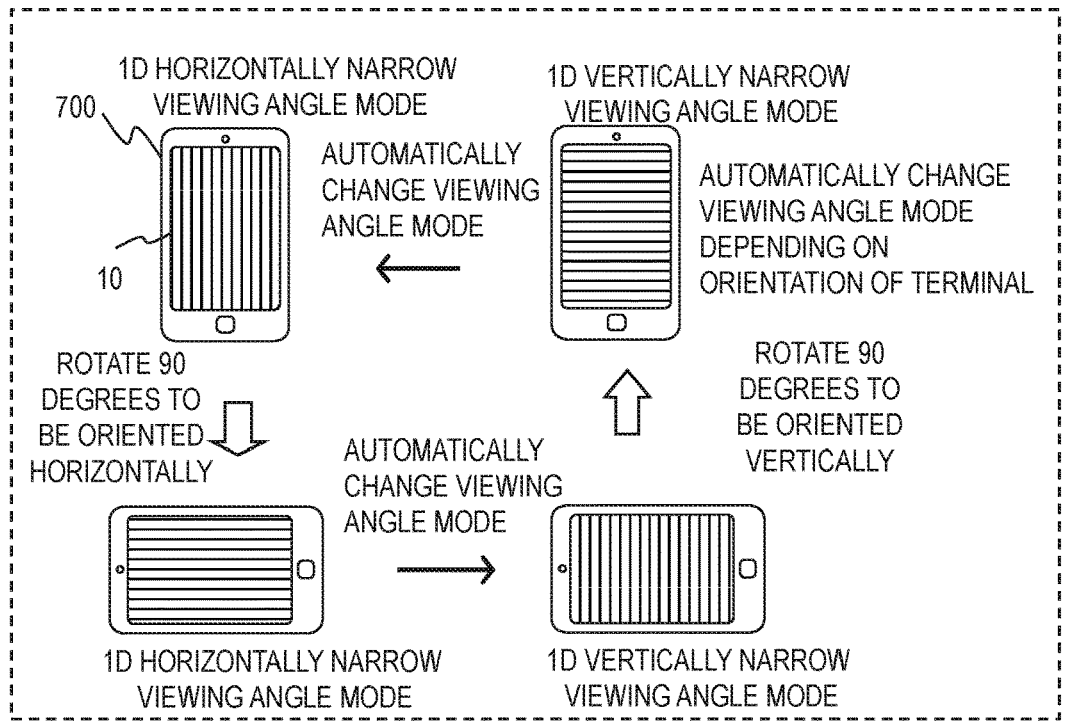
FIG. 38C schematically illustrates still another function of the mobile terminal.

Next, an example of a mobile terminal with a light distribution control panel 10 is described. The mobile terminal can be an electronic device such as a smartphone or a tablet computer. The following description is applicable to electronic devices other than mobile terminals. FIGS. 38A, 38B, and 38C schematically illustrate functions of a mobile terminal 700 including a display panel and a light distribution control panel 10. The direction directed from the top to the bottom of FIGS. 38A, 38B, and 38C is defined as vertical direction.

The light distribution control panel 10 is disposed on the front of the display panel or between the backlight and the display panel. The light distribution control panel 10 has the above-described wide viewing angle mode, 1D horizontally narrow viewing angle mode, 1D vertically narrow viewing angle mode, and 2D narrow viewing angle mode. The mobile terminal 700 controls the viewing angle mode of the light distribution control panel 10 in accordance with the selection by the user.

In FIG. 38A, the light distribution control panel 10 is in the wide viewing angle mode. The wide viewing angle mode is maintained despite the orientation of the mobile terminal 700 with respect to the vertical direction. In FIG. 38B, the light distribution control panel 10 is in the 2D narrow viewing angle mode. The 2D narrow viewing angle mode is maintained despite the orientation of the mobile terminal 700 with respect to the vertical direction.

In FIG. 38C, the light distribution control panel 10 switches between the 1D horizontally narrow viewing angle mode and the 1D vertically narrow viewing angle mode depending on the orientation of the mobile terminal 700. In FIG. 38C, assume that the longitudinal directions of the mobile terminal 700 correspond to the vertical directions (the directions along the Y-axis) of the light distribution control panel 10 and the lateral directions of the mobile terminal 700 correspond to the horizontal directions (the directions along the X-axis) of the light distribution control panel 10. In FIG. 38C, the mobile terminal 700 controls the viewing angle mode to attain a narrow viewing angle in the horizontal directions and a wide viewing angle in the vertical directions.

When the mobile terminal 700 is oriented vertically, or when its short side is horizontal, the light distribution control panel 10 is in the 1D horizontally narrow viewing angle mode. When the mobile terminal 700 is rotated to be oriented horizontally, the light distribution control panel 10 changes to the 1D vertically narrow viewing angle mode. When the mobile terminal 700 is further rotated to be oriented vertically, the light distribution control panel 10 changes to the 1D horizontally narrow viewing angle mode.

In the example of FIG. 38C, the mobile terminal 700 can control the viewing angle mode of the light distribution control panel 10 to attain a narrow viewing angle in the vertical directions and a wide viewing angle in the horizontal directions. When the mobile terminal 700 is oriented vertically, the light distribution control panel 10 is in the 1D vertically narrow viewing angle mode; when the mobile terminal 700 is oriented horizontally, the light distribution control panel 10 is in the 1D horizontally narrow viewing angle mode.

Figure 39:
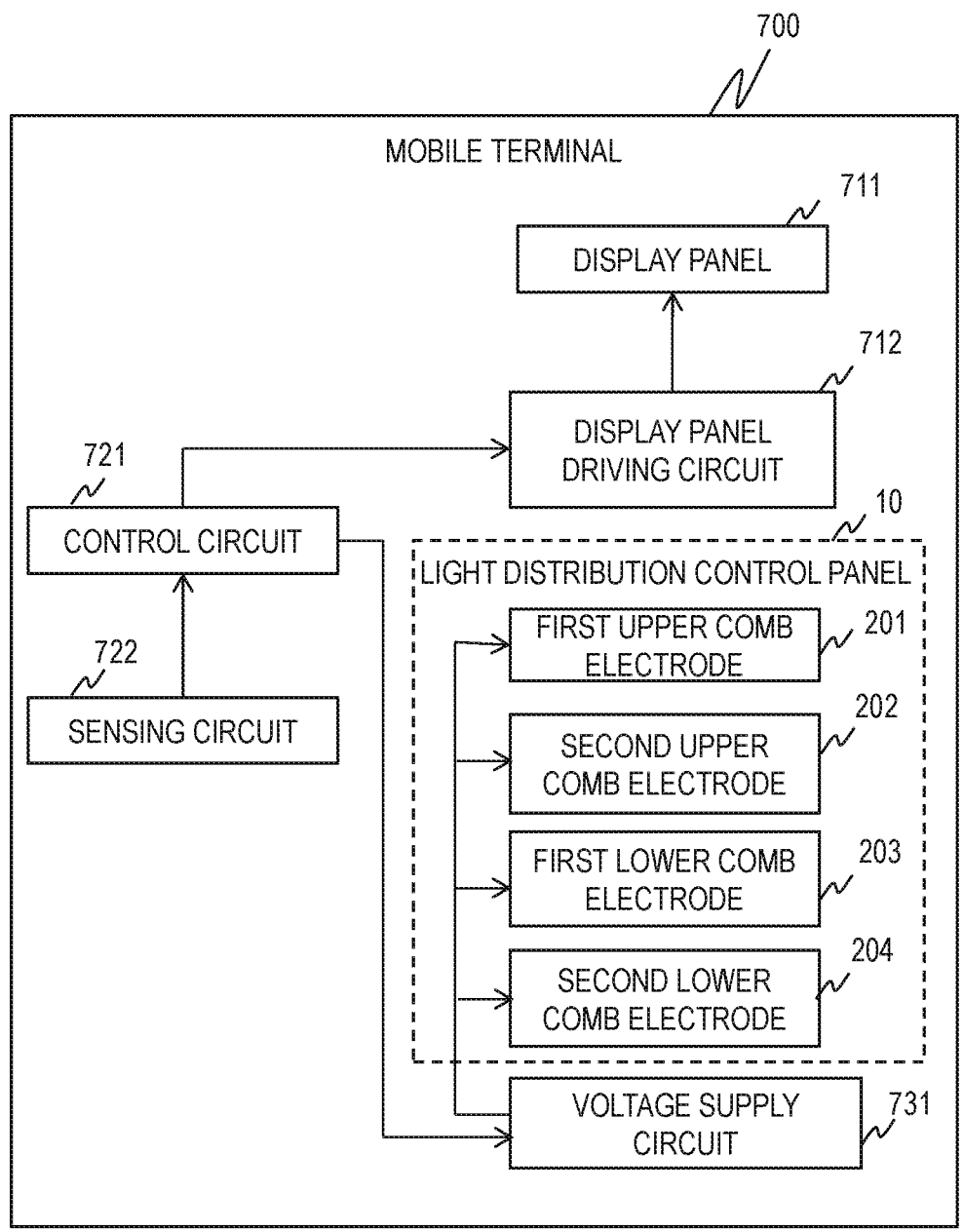
FIG. 39 schematically illustrates a logical configuration of the mobile terminal.

FIG. 39 schematically illustrates a logical configuration of the mobile terminal 700. The mobile terminal 700 includes a display panel 711 and a display panel driving circuit 712 for driving the display panel 711. The display panel 711 can be an organic light emitting diode (OLED) display panel or a liquid crystal display panel. The display panel driving circuit 712 includes a scanning line driver circuit and a data line driver circuit and drives the display panel 711 to display an image thereon.

The mobile terminal 700 further includes a control circuit 721 and a sensing circuit 722. The control circuit 721 includes a user interface and controls the other components in the mobile terminal 700. The sensing circuit 722 senses the orientation (inclination) of the mobile terminal 700. For example, the mobile terminal 700 includes a three-axis gyroscope. The sensing circuit 722 determines the orientation of the mobile terminal 700 with respect to the vertical direction (the direction of gravity) from the value of the three-axis gyroscope.

The mobile terminal 700 further includes a light distribution control panel 10 and a voltage supply circuit 731. The voltage supply circuit 731 applies potentials (voltages) suitable for a viewing angle mode to the electrodes 201 to 204 in accordance with a control signal from the control circuit 721. The control circuit 721 determines a viewing angle mode in accordance with the user's instruction and the orientation of the mobile terminal 700 sensed by the sensing circuit 722 and sends a control signal indicating the determined viewing angle mode to the voltage supply circuit 721. Note that each of the light distribution control panel 10, the set of the light distribution control panel 10 and the voltage supply circuit 731, and the set of the light distribution control panel 10, the voltage supply circuit 731, and the control circuit 721 is a light distribution control device.

As set forth the above, embodiments of this disclosure have been described in detail with reference to the accompanying drawings. However, this disclosure is not limited to those specific configurations but includes various modifications and equivalent configurations within the scope of the appended claims.

What is claimed is:

1. A light distribution control device configured to control an angle range to transmit light, the light distribution control device comprising:
   first upper electrodes and second upper electrodes disposed alternately in a first direction;
   first lower electrodes and second lower electrodes disposed alternately in a second direction that crosses the first direction;
   light transmissive regions disposed between an upper electrode set consisting of the first upper electrodes and the second upper electrodes and a lower electrode set consisting of the first lower electrodes and second lower electrodes; and
   colored electrophoretic particles and a dispersion medium contained in a space between light transmissive regions,
   wherein each of the first upper electrodes extends along the space between light transmissive regions,
   wherein each of the second upper electrodes extends along a line of light transmissive regions,
   wherein each of the first lower electrodes extends along the space between light transmissive regions, and wherein each of the second lower electrodes extends along a line of light transmissive regions.

2. The light distribution control device according to claim 1,
wherein the first upper electrodes and the second upper electrodes are disposed on different layers, and
wherein an insulating layer is disposed between the first upper electrodes and the second upper electrodes.

3. The light distribution control device according to claim 2, wherein a first upper electrode and a second upper electrode adjacent to each other overlap each other, when viewed planarly.

4. The light distribution control device according to claim 2, wherein an insulating layer is disposed to cover the first upper electrodes, the second upper electrodes, and the insulating layer disposed between the first upper electrodes and the second upper electrodes.

5. The light distribution control device according to claim 1,
wherein the first lower electrodes and the second lower electrodes are disposed on different layers, and
wherein an insulating layer is disposed between the first lower electrodes and the second lower electrodes.

6. The light distribution control device according to claim 5, wherein a first lower electrode and a second lower electrode adjacent to each other overlap each other, when viewed planarly.

7. The light distribution control device according to claim 5, wherein an insulating layer is disposed to cover the first lower electrodes, the second lower electrodes, and the insulating layer disposed between the first lower electrodes and the second lower electrodes.

8. The light distribution control device according to claim 1,
wherein the first upper electrodes are parts of a first upper comb electrode,
wherein the second upper electrodes are parts of a second upper comb electrode,
wherein the first lower electrodes are parts of a first lower comb electrode, and
wherein the second lower electrodes are parts of a second lower comb electrode.

9. The light distribution control device according to claim 1, wherein a shape of each light transmissive region is a parallelogram having interior angles different from right angles, when viewed planarly.

10. The light distribution control device according to claim 1, further comprising a voltage supply circuit,
wherein the voltage supply circuit is configured to supply the first upper electrodes, the second upper electrodes, and the first lower electrodes with a first potential and the second lower electrodes with a second potential different from the first potential in a first mode,
wherein the voltage supply circuit is configured to supply the first upper electrodes, the first lower electrodes, and the second lower electrodes with a third potential and the second upper electrodes with a fourth potential different from the third potential in a second mode,
wherein the voltage supply circuit is configured to supply the first upper electrodes, the second upper electrodes, the first lower electrodes, and the second lower electrodes with the same potential in a third mode, and
wherein the voltage supply circuit is configured to supply the first upper electrodes and the second upper electrodes with a fifth potential and the first lower electrodes and the second lower electrodes with a sixth potential different from the fifth potential in a fourth mode.

11. An electronic device comprising:
the light distribution control device according to claim 1; and
a control circuit configured to control the light distribution control device,
wherein the control circuit is configured to:
sense orientation of the electronic device; and
control potentials to be supplied to the first upper electrodes, the second upper electrodes, the first lower electrodes, and the second lower electrodes of the light distribution control device, based on the orientation.

12. The light distribution control device according to claim 1, wherein an insulating layer is disposed to cover the first upper electrodes and the second upper electrodes.

* * * * *